United States Patent [19]

Denneau, Jr.

[11] Patent Number: 5,717,782
[45] Date of Patent: Feb. 10, 1998

[54] METHOD AND APPARATUS FOR RESTORING DIGITIZED VIDEO PICTURES GENERATED BY AN OPTICAL SURFACE-HEIGHT PROFILER

[75] Inventor: Larry Denneau, Jr., Tucson, Ariz.

[73] Assignee: Wyko Corporation, Tucson, Ariz.

[21] Appl. No.: 339,405

[22] Filed: Nov. 14, 1994

Related U.S. Application Data

[63] Continuation-in-part of Ser. No. 168,134, Dec. 17, 1993, abandoned.

[51] Int. Cl.⁶ .............................. G06K 9/00; G06K 9/36; G06K 9/54
[52] U.S. Cl. .............................. 382/154; 382/275
[58] Field of Search .............................. 382/106, 108, 382/154, 270, 272, 254, 256, 257, 258, 259, 267, 274, 275, 276, 298, 299, 300; 364/413.18, 413.17, 723; 356/345, 357, 358; 348/581, 616; 358/428, 447, 451, 525

[56] References Cited

U.S. PATENT DOCUMENTS

| | | | |
|---|---|---|---|
| 4,137,530 | 1/1979 | Hooker, Jr. | 343/5 |
| 4,163,257 | 7/1979 | White | 358/133 |
| 4,298,895 | 11/1981 | Arai et al. | 358/284 |
| 4,323,974 | 4/1982 | Sekigawa | 364/515 |
| 4,360,883 | 11/1982 | Ejiri et al. | 364/515 |
| 4,646,355 | 2/1987 | Petrick et al. | 382/54 |
| 4,807,033 | 2/1989 | Keesen et al. | 358/167 |
| 4,837,732 | 6/1989 | Brandestini et al. | 364/413.28 |
| 4,876,595 | 10/1989 | Veldhuis | 358/136 |
| 5,034,992 | 7/1991 | Kimagai | 382/54 |
| 5,153,748 | 10/1992 | Moyer | 358/443 |

OTHER PUBLICATIONS

Shih et al., "A Mathematical Morphology Approach to Euclidean Distance Transformation," IEEE Transactions on Image Processing, vol. 1, No. 2, pp. 197–204, Apr. 1992.

Primary Examiner—Michael T. Razavi
Assistant Examiner—Marc Bobys
Attorney, Agent, or Firm—Antonio R. Durando

[57] ABSTRACT

A method for correcting a height map produced by an optical height profiler while scanning a target surface. Regions of bad data are identified and erroneous height values are replaced with provisional height values based selected from neighboring valid height values. Each provisional height value is also assigned a position index corresponding to its proximity to the boundary of the region. Starting from the interior of the region, the technique then replaces each provisional height value with a corrected height value calculated by interpolation of valid height values as a function of distance from the boundary as represented by the position indices. The resulting corrected height map is suitable for on-line visual display.

7 Claims, 22 Drawing Sheets

|    | 1      | 2      | 3      | 4      | 5      | 6      | 7      | 8      | 9      | 10     | 11     | 12     | 13     | 14     | 15     | 16     | 17     | 18     |
|----|--------|--------|--------|--------|--------|--------|--------|--------|--------|--------|--------|--------|--------|--------|--------|--------|--------|--------|
| 1  | BAD    | BAD    | BAD    | BAD    | BAD    | BAD    | 699.37 | 700.63 | 684.72 | 686.45 | 684.75 | 694.91 | BAD    | BAD    | BAD    | BAD    | BAD    | 292.44 |
| 2  | BAD    | BAD    | BAD    | BAD    | BAD    | BAD    | 747.28 | BAD    | 693.49 | 696.92 | 683.09 | 668.36 | 665.24 | 619.74 | BAD    | 582.94 | BAD    | BAD    |
| 3  | BAD    | BAD    | BAD    | 680.4  | BAD    | 766.84 | 750.54 | 738.23 | 702.41 | 684.00 | BAD    | 669.26 | 670.19 | 635.31 | BAD    | BAD    | 470.97 | 440.25 |
| 4  | BAD    | BAD    | BAD    | 751.26 | 765.02 | 760.46 | 686.76 | BAD    | 650.67 | BAD    | 579.32 | BAD    | 660.93 | 659.39 | 661.00 | BAD    | BAD    | 493.08 |
| 5  | BAD    | 710.05 | 755.21 | 758.96 | 765.53 | 752.57 | BAD    | BAD    | BAD    | BAD    | BAD    | BAD    | BAD    | 656.70 | 661.00 | 655.99 | BAD    | BAD    |
| 6  | BAD    | 757.22 | 756.94 | 757.87 | 752.43 | BAD    | BAD    | BAD    | BAD    | BAD    | BAD    | BAD    | BAD    | 627.36 | 663.14 | 664.94 | 661.32 | 621.25 |
| 7  | 732.84 | 761.69 | 755.63 | BAD    | BAD    | BAD    | BAD    | BAD    | BAD    | BAD    | BAD    | 366.26 | BAD    | BAD    | BAD    | 661.65 | 665.19 | 677.12 |
| 8  | 741.90 | 741.74 | BAD    | BAD    | BAD    | BAD    | BAD    | 338.41 | 301.18 | 253.15 | 250.57 | BAD    | BAD    | BAD    | BAD    | 622.98 | 654.49 | 668.61 |
| 9  | 712.15 | BAD    | 551.13 | 594.16 | BAD    | BAD    | BAD    | 280.73 | BAD    | 187.67 | 190.72 | BAD    | BAD    | BAD    | BAD    | BAD    | BAD    | 646.76 |
| 10 | BAD    | BAD    | BAD    | BAD    | BAD    | 334.80 | BAD    | 158.94 | 173.81 | 128.59 | 148.99 | 180.40 | BAD    | BAD    | BAD    | 459.68 | 551.62 | 623.24 |
| 11 | 659.63 | BAD    | BAD    | BAD    | 387.82 | BAD    | BAD    | BAD    | 145.93 | 130.88 | 138.92 | 186.07 | BAD    | BAD    | BAD    | BAD    | BAD    | BAD    |
| 12 | 679.04 | 635.47 | BAD    | BAD    | BAD    | BAD    | BAD    | BAD    | BAD    | 162.77 | 166.13 | BAD    | BAD    | BAD    | BAD    | BAD    | BAD    | 755.04 |
| 13 | 674.79 | 677.48 | BAD    | BAD    | BAD    | BAD    | BAD    | BAD    | BAD    | 203.22 | BAD    | BAD    | BAD    | BAD    | BAD    | BAD    | 756.55 | 759.99 |
| 14 | 678.64 | 666.06 | 664.75 | 640.58 | BAD    | BAD    | BAD    | BAD    | BAD    | BAD    | BAD    | BAD    | BAD    | BAD    | 747.24 | 755.10 | 759.75 | 760.34 |
| 15 | 622.96 | 660.63 | 666.24 | 664.75 | 666.08 | 650.43 | BAD    | BAD    | BAD    | BAD    | BAD    | BAD    | 690.63 | BAD    | 755.10 | 769.21 | 760.32 | 732.41 |
| 16 | BAD    | BAD    | 649.17 | 666.54 | 667.33 | 668.98 | 661.47 | BAD    | BAD    | 632.59 | BAD    | 678.71 | 747.57 | 755.42 | 755.75 | 758.36 | 770.38 | BAD    |
| 17 | 140.25 | BAD    | BAD    | 645.91 | BAD    | BAD    | BAD    | BAD    | BAD    | BAD    | BAD    | 736.72 | 755.50 | 755.69 | 755.25 | BAD    | BAD    | BAD    |
| 18 | BAD    | BAD    | BAD    | BAD    | BAD    | 665.24 | 669.97 | 662.26 | 657.04 | 697.54 | 723.57 | 734.63 | BAD    | BAD    | BAD    | BAD    | BAD    | 517.34 |

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 18 | 1 | - | 1 | - | 1 | - | 1 | 1 | 1 | 1 | 1 | - | 1 | 1 | 1 | 1 | - | 1 |
| 17 | 1 | - | 1 | - | 1 | - | 1 | 1 | 1 | - | 1 | 1 | - | 1 | 1 | 1 | - | - |
| 16 | 1 | - | 1 | - | 1 | 1 | 1 | 1 | - | 1 | - | 2 | - | 1 | 1 | - | - | 2 |
| 15 | 2 | - | 1 | - | 1 | - | 1 | - | 2 | - | 2 | 2 | - | 1 | 1 | 1 | 1 | - |
| 14 | 1 | - | 1 | 1 | 1 | 1 | - | 2 | 3 | 2 | 2 | 3 | 2 | - | - | 1 | 1 | - |
| 13 | 1 | - | 1 | 1 | - | 1 | 2 | 2 | 1 | - | 2 | 2 | 1 | - | 1 | 1 | - | 1 |
| 12 | 1 | 1 | 1 | - | 2 | 1 | 1 | - | 1 | - | 1 | 1 | - | 2 | 2 | 1 | 1 | 1 |
| 11 | 1 | 1 | - | 1 | - | 2 | 1 | 1 | 1 | 1 | - | 1 | - | 2 | 2 | 1 | - | 1 |
| 10 | 1 | 1 | - | 1 | - | 2 | 2 | 1 | 1 | 1 | 1 | 1 | - | 2 | 1 | - | 1 | 1 |
| 9 | 1 | 1 | 1 | - | 2 | - | 1 | - | 1 | 1 | - | 1 | - | 2 | 3 | 2 | - | 1 |
| 8 | 1 | 1 | 1 | - | 2 | - | 1 | 1 | - | 1 | - | 2 | 3 | 3 | 2 | - | 1 | 1 |
| 7 | 1 | - | 1 | 1 | - | 2 | - | 1 | 2 | 1 | 2 | 3 | 3 | 2 | - | 1 | 1 | 1 |
| 6 | 1 | - | 1 | 1 | - | 2 | 2 | 2 | - | 1 | - | 2 | 2 | - | 1 | 1 | - | 1 |
| 5 | 2 | 2 | - | 1 | 1 | 1 | - | 2 | 2 | - | 1 | - | 1 | - | - | 1 | 1 | - |
| 4 | 2 | - | 1 | 1 | 1 | 1 | - | 2 | 2 | - | - | - | - | 1 | 1 | 1 | 1 | - |
| 3 | 3 | 2 | 1 | - | 1 | 1 | 1 | - | 1 | - | - | 1 | 1 | 1 | 1 | - | - | 2 |
| 2 | 4 | 3 | 2 | - | 1 | 1 | 1 | - | 1 | 1 | - | 1 | 1 | 1 | - | - | - | 2 |
| 1 | 5 | 4 | 3 | 2 | - | 1 | 1 | 1 | - | 1 | 1 | - | 1 | 1 | - | 1 | - | 1 |

144

|    | 1      | 2      | 3      | 4      | 5      | 6      | 7      | 8      | 9      | 10     | 11     | 12     | 13     | 14     | 15     | 16     | 17     | 18     |
|----|--------|--------|--------|--------|--------|--------|--------|--------|--------|--------|--------|--------|--------|--------|--------|--------|--------|--------|
| 1  | 680.40 | 680.40 | 680.40 | 680.40 | 699.37 | 699.37 | 699.37 | 700.63 | 684.72 | 686.45 | 684.75 | 694.91 | 694.91 | 619.74 | 619.74 | 582.94 | 292.44 | 292.44 |
| 2  | 680.40 | 680.40 | 680.40 | 680.40 | 680.40 | 766.84 | 699.37 | 693.49 | 693.49 | 696.92 | 683.09 | 668.36 | 665.24 | 619.74 | 619.74 | 582.94 | 582.94 | 292.44 |
| 3  | 680.40 | 680.40 | 680.40 | 680.40 | 680.40 | 766.84 | 747.28 | 738.23 | 702.41 | 684.00 | 684.00 | 669.26 | 670.19 | 635.31 | 635.31 | 470.97 | 470.97 | 440.25 |
| 4  | 710.05 | 710.05 | 751.26 | 751.26 | 765.02 | 760.46 | 750.54 | 750.54 | 650.67 | 650.67 | 579.32 | 579.32 | 660.93 | 659.39 | 659.39 | 655.99 | 493.08 | 493.08 |
| 5  | 710.05 | 710.05 | 755.21 | 758.96 | 765.53 | 752.57 | 686.76 | 686.76 | 650.67 | 650.67 | 579.32 | 579.32 | 656.70 | 656.70 | 661.00 | 655.99 | 655.99 | 493.08 |
| 6  | 757.22 | 757.22 | 756.94 | 757.87 | 752.43 | 752.43 | 686.76 | 686.76 | 650.67 | 253.15 | 366.26 | 366.26 | 627.36 | 627.36 | 663.14 | 664.94 | 661.32 | 621.25 |
| 7  | 732.84 | 761.69 | 755.63 | 755.63 | 752.43 | 752.43 | 338.41 | 338.41 | 301.18 | 253.15 | 366.26 | 366.26 | 627.36 | 627.36 | 661.65 | 661.65 | 665.19 | 677.12 |
| 8  | 741.90 | 741.74 | 741.74 | 741.74 | 387.82 | 338.41 | 338.41 | 338.41 | 301.18 | 253.15 | 250.57 | 250.57 | 366.26 | 622.98 | 622.98 | 622.98 | 654.49 | 668.61 |
| 9  | 712.15 | 712.15 | 551.13 | 551.13 | 387.82 | 280.73 | 280.73 | 280.73 | 280.73 | 187.67 | 190.72 | 190.72 | 250.57 | 190.72 | 622.98 | 622.98 | 646.76 | 646.76 |
| 10 | 712.15 | 551.13 | 551.13 | 551.13 | 387.82 | 334.80 | 334.80 | 173.81 | 173.81 | 128.59 | 148.99 | 180.40 | 190.72 | 180.40 | 459.68 | 459.68 | 551.62 | 623.24 |
| 11 | 659.63 | 659.63 | 551.13 | 387.82 | 387.82 | 334.80 | 334.80 | 158.94 | 145.93 | 130.88 | 138.92 | 186.07 | 180.40 | 186.07 | 459.68 | 459.68 | 551.62 | 623.24 |
| 12 | 679.04 | 635.47 | 635.47 | 594.16 | 594.16 | 334.80 | 334.80 | 158.94 | 162.77 | 162.77 | 166.13 | 166.13 | 186.07 | 166.13 | 747.24 | 755.04 | 755.04 | 755.04 |
| 13 | 674.79 | 677.48 | 677.48 | 594.16 | 594.16 | 594.16 | 594.16 | 203.22 | 203.22 | 203.22 | 203.22 | 203.22 | 690.63 | 747.24 | 747.24 | 756.55 | 756.55 | 759.99 |
| 14 | 678.64 | 666.06 | 664.75 | 640.58 | 640.58 | 640.58 | 640.58 | 203.22 | 203.22 | 203.22 | 203.22 | 690.63 | 690.63 | 747.24 | 747.24 | 755.10 | 759.75 | 760.34 |
| 15 | 622.96 | 660.63 | 666.24 | 664.75 | 664.75 | 650.43 | 650.43 | 650.43 | 632.59 | 632.59 | 690.63 | 690.63 | 690.63 | 690.63 | 755.10 | 769.21 | 760.32 | 732.41 |
| 16 | 622.96 | 649.17 | 649.17 | 666.54 | 666.08 | 668.98 | 661.47 | 650.43 | 632.59 | 632.59 | 678.71 | 678.71 | 747.57 | 755.42 | 755.75 | 758.36 | 770.38 | 770.38 |
| 17 | 140.25 | 140.25 | 645.91 | 645.91 | 667.33 | 668.98 | 661.47 | 661.47 | 632.59 | 632.59 | 632.59 | 736.72 | 755.50 | 755.69 | 755.25 | 755.25 | 770.38 | 517.34 |
| 18 | 140.25 | 140.25 | 645.91 | 645.91 | 665.24 | 665.24 | 669.97 | 662.26 | 657.04 | 697.54 | 723.57 | 734.63 | 734.63 | 755.69 | 755.25 | 755.25 | 517.34 | 517.34 |

FIG. 20

|    | 1      | 2      | 3      | 4      | 5      | 6      | 7      | 8      | 9      | 10     | 11     | 12     | 13     | 14     | 15     | 16     | 17     | 18     |
|----|--------|--------|--------|--------|--------|--------|--------|--------|--------|--------|--------|--------|--------|--------|--------|--------|--------|--------|
| 1  | 680.40 | 680.40 | 680.40 | 685.14 | 691.78 | 716.80 | 699.37 | 700.63 | 684.72 | 686.45 | 684.75 | 694.91 | 669.85 | 624.18 | 601.34 | 498.37 | 389.27 | 292.44 |
| 2  | 680.40 | 680.40 | 680.40 | 702.01 | 723.62 | 744.35 | 729.35 | 715.86 | 693.49 | 696.92 | 683.09 | 668.36 | 665.24 | 619.74 | 600.39 | 582.94 | 486.10 | 356.99 |
| 3  | 695.22 | 695.22 | 704.02 | 680.40 | 723.62 | 766.84 | 747.28 | 738.23 | 702.41 | 684.00 | 631.66 | 669.26 | 670.19 | 635.31 | 565.18 | 532.65 | 470.97 | 440.25 |
| 4  | 700.16 | 713.90 | 738.15 | 751.26 | 765.02 | 760.46 | 750.54 | 700.60 | 650.67 | 587.83 | 579.32 | 590.37 | 660.93 | 659.39 | 629.06 | 601.69 | 532.65 | 493.08 |
| 5  | 719.18 | 710.05 | 755.21 | 758.96 | 765.53 | 752.57 | 686.76 | 575.26 | 571.17 | 491.66 | 533.17 | 511.48 | 586.20 | 656.70 | 661.00 | 655.99 | 605.24 | 557.17 |
| 6  | 744.54 | 757.22 | 756.94 | 757.87 | 752.43 | 669.69 | 599.67 | 512.58 | 491.66 | 348.56 | 487.01 | 453.29 | 540.33 | 627.36 | 663.14 | 664.94 | 661.32 | 621.25 |
| 7  | 732.84 | 761.69 | 755.63 | 715.85 | 669.63 | 586.82 | 512.58 | 442.12 | 412.16 | 306.16 | 368.79 | 366.26 | 453.29 | 557.47 | 627.92 | 661.65 | 665.19 | 677.12 |
| 8  | 741.90 | 741.74 | 687.46 | 673.83 | 586.82 | 433.78 | 435.30 | 338.41 | 301.18 | 253.15 | 250.57 | 334.80 | 406.85 | 476.91 | 526.27 | 622.98 | 654.49 | 668.61 |
| 9  | 712.15 | 678.20 | 583.04 | 530.82 | 433.78 | 341.95 | 314.64 | 280.73 | 237.50 | 187.67 | 190.72 | 231.87 | 270.98 | 401.69 | 475.45 | 522.04 | 610.34 | 646.76 |
| 10 | 658.47 | 593.49 | 551.13 | 496.69 | 415.74 | 308.12 | 254.30 | 219.83 | 173.81 | 128.59 | 148.99 | 180.40 | 250.22 | 320.04 | 420.71 | 459.68 | 551.62 | 623.24 |
| 11 | 659.63 | 623.46 | 511.64 | 456.60 | 387.82 | 334.80 | 246.87 | 158.94 | 145.93 | 130.88 | 138.92 | 186.07 | 281.00 | 295.52 | 521.38 | 533.90 | 644.47 | 689.14 |
| 12 | 679.04 | 635.47 | 594.56 | 491.19 | 464.48 | 363.77 | 313.42 | 237.58 | 176.48 | 162.77 | 166.13 | 271.03 | 375.93 | 456.68 | 531.27 | 608.12 | 682.33 | 755.04 |
| 13 | 674.79 | 677.48 | 635.82 | 594.16 | 518.27 | 457.11 | 390.66 | 316.23 | 289.72 | 203.22 | 282.15 | 375.93 | 561.58 | 553.53 | 606.36 | 706.49 | 756.55 | 759.99 |
| 14 | 678.64 | 666.06 | 664.75 | 640.58 | 591.51 | 573.11 | 458.77 | 394.88 | 346.34 | 300.70 | 398.18 | 564.75 | 623.47 | 650.38 | 747.24 | 755.10 | 759.75 | 760.34 |
| 15 | 622.96 | 660.63 | 666.24 | 664.75 | 641.22 | 586.55 | 522.66 | 458.77 | 417.90 | 398.18 | 573.65 | 627.69 | 690.63 | 720.41 | 755.10 | 769.21 | 760.32 | 732.41 |
| 16 | 309.89 | 487.17 | 649.17 | 666.54 | 666.08 | 650.43 | 592.06 | 526.33 | 489.46 | 491.69 | 616.37 | 678.71 | 747.57 | 755.42 | 755.75 | 758.36 | 770.38 | 686.03 |
| 17 | 140.25 | 308.80 | 535.72 | 645.91 | 667.33 | 668.98 | 661.47 | 594.30 | 573.25 | 632.59 | 696.61 | 736.72 | 755.50 | 755.69 | 755.25 | 680.99 | 686.03 | 573.57 |
| 18 | 241.38 | 342.51 | 524.55 | 571.45 | 635.37 | 665.24 | 669.97 | 662.26 | 657.04 | 697.54 | 723.57 | 734.63 | 741.65 | 751.01 | 695.77 | 636.30 | 573.57 | 517.34 |

METHOD AND APPARATUS FOR RESTORING DIGITIZED VIDEO PICTURES GENERATED BY AN OPTICAL SURFACE-HEIGHT PROFILER

RELATED APPLICATIONS

This is a continuation-in-part application of commonly-assigned U.S. Ser. No. 08/168,134, now abandoned, filed by the same inventor on Dec. 17, 1993.

BACKGROUND OF THE INVENTION

1. Field of the Invention

This invention pertains to the general field of data correction and restoration and, in particular, it provides a novel approach to the problem of restoring missing or erroneous elements in video pictures generated by optical devices adapted for measuring surface height profiles.

2. Description of the Prior Art

During the last couple of decades, a class of instruments generally known as optical profilers has become essential in testing the surface characteristics of electronic and other products for quality control. For example, hard-disc surfaces, magnetic recording heads, print rolls, microscope and telescope mirrors, all have very smooth surfaces that require accurate measurement of surface characteristics for quality control during manufacturing. A precise height profile or map of the surface is generated by performing discrete optical measurements as the surface is scanned by an instrument. Typically, these measurements are then displayed through a video monitor and/or processed in a computer to generate analytical information about the measured properties.

As signals are generated, processed and transmitted, errors occur that result in bad data points that must be identified and corrected for the continued proper functioning of the equipment. Various methods have been provided for filtering, curve fitting and manipulating data so that their usefulness and reliability may be optimized. In the case of signals generated by surface profilers when the height of a surface is measured and mapped with scanning optical devices, such as by interferometry or scanning microscopy, problems with surface reflectivity often result in erroneous or missing data that affect the usefulness of the video pictures displayed by the equipment and of the analytical information, such as statistical data, that the measurements provide.

Such missing data prevent the accurate display of the surface height in corresponding regions of the target surface. Surface-fitting techniques can be employed to fill in gaps and smooth scattered or noisy height signals; but these methods, which are mostly based on polynomial fitting techniques, are computationally time consuming and tend to produce unrealistic value oscillations between neighboring elements in a map of restored missing signals. Thus, the resulting restored signals often do not represent realistic estimates of their true values.

Various approaches have been devised for specific applications such as radar, television and video digital-image processing, as disclosed in U.S. Pat. Nos. 4,137,530, 4,298,895, 4,323,974, 4,360,883, 4,646,355, 4,807,033, 4,876,595, 5,034,992 and U.S. Pat. No. 5,153,748. These methods are directed at solving particular problems in those areas and, because of their specificity and complexity, do not easily or usefully lend themselves to application in optical-profiler technology; in particular, they are not suitable for on-line correction of fast-scanning optical apparatus controlled by microprocessors of limited speed and capability, such as personal computers and work stations. These methods are often iterative in nature and require substantial processing time, which reduces their attractiveness for on-line applications.

Interferometers and scanning microscopes used to generate on-line surface-height maps typically scan a target surface in raster fashion over x-y coordinates corresponding to a predetermined grid of equal-size pixels having centers typically 0.5 to 10 microns apart. One or more optical signals, depending on the optical instrument utilized, are generated at each pixel, detected and converted to an electronic signal by an electronic sensor (normally an array of CCD cells), stored in a memory and processed to yield a height measurement for that pixel, which is also stored. The values corresponding to the complete height map for the target surface are then tested for bad data points or gaps, which are typically isolated by assigning arbitrary, characteristically-recognizable values to them. The resulting height profile is then stored and displayed on line on a video monitor, where the erroneous height values are identified by the arbitrary values assigned to them. Even without signal correction, a lag time of about 5 to 10 seconds is typical for interferometric and scanning-microscope profilers; therefore, the introduction of further delay in displaying an image of the measured profile by correction or restoration of erroneous signals is very undesirable for on-line applications. Such a delay is particularly unacceptable for quality control applications during manufacturing, when fast feedback to an operator or to an automaton is essential for high productivity.

Accordingly, it would be very desirable to have a simple and fast method for correcting erroneous signals generated by an optical profiler, especially a method with minimal storage and computational requirements, so that it could be used for on-line applications without materially increasing the overall signal-processing time. This invention provides a signal-processing method of linear complexity that is suitable for such applications. The method of the invention was developed for restoring signals of a video picture corresponding to a relief map (that is, a two-dimensional height map) of a surface on the basis of digital height interferometric measurements, but it can be applied to correct erroneous measurements corresponding to any two-dimensional map of spatially-related physical quantities (that is, measurements of physical properties that are not independent between adjacent pixels).

BRIEF SUMMARY OF THE INVENTION

It is therefore an objective of this invention to provide a system for displaying corrected height values for a two-dimensional relief map of a test surface for which invalid measurement signals have been recorded.

Another objective of the invention is to achieve such corrected map by using a computationally-efficient process, such that computer processing time is minimized.

Another goal of the invention is a method that is computationally stable and produces corrected portions in a two-dimensional height map that are consistent with neighboring portions corresponding to valid height measurements.

A further objective of the invention is a processing system that is capable of implementation in real time for on-line optical-profiler applications.

Another goal of the invention is its adaptability to the correction of erroneous signals or gaps in a two-dimensional map of any surface property measured by an instrument that produces digital signals related to a field of pixels on a target surface. Finally, another goal is the realization of the above mentioned objectives in a system that can be implemented, to a large extent, with conventional sensory, computing, and other hardware devices.

In accordance with these and other objectives, the preferred embodiment of the method and apparatus of this invention consists of an interferometer that scans a target surface and produces interferometric height signals for each pixel of a predetermined surface grid representative of the target surface, thereby generating the information necessary to construct a two-dimensional height map of the target surface. The map is displayed on-line by video-monitor apparatus that converts each signal corresponding to the height at a pixel on the surface grid into a visually-perceptible output representative of a relative elevation of the surface at the coordinates corresponding to that pixel.

According to one aspect of the invention, prior to visual display, an error detection circuit identifies individual pixels or blocks of contiguous pixels having erroneous height values. Each such erroneous height value is then replaced in an error correction circuit by a calculated height value based on valid height values at neighboring pixels.

According to another aspect of the invention, after identification of blocks of pixels with erroneous height values and establishment of a corresponding erroneous-height-pixel boundary defining a border between erroneous-height pixels and other pixels, the error correction circuit first provisionally sets a height value for each erroneous-height pixel equal to the value at a valid-height pixel adjacent thereto. The error correction circuit then assigns a position index to each erroneous-height pixel, such index being relative to neighboring valid-height pixels along the erroneous-height-pixel boundary. Thus, as a first step, erroneous-height pixels immediately adjacent to a valid-height pixel at the erroneous-height-pixel boundary are provisionally assigned a height value equal to that of such adjacent valid-height pixel and are assigned a position index 1, thus creating a new erroneous-height-pixel boundary. As a second step, the procedure is repeated and erroneous-height pixels one pixel removed in the grid are provisionally assigned height values equal to those at adjacent provisional-height pixels along the newly established erroneous-height-pixel boundary and are assigned index 2. The procedure is then repeated again and a new layer of erroneous-height pixels yet one pixel removed is provisionally assigned height values equal to those of adjacent provisional-height pixels (propagated during the prior step) and are assigned index 3, etc., until all erroneous-height pixels in the block have been provisionally assigned a height value equal to that at an adjacent pixel (whether originally valid or provisionally propagated during the prior step) and a corresponding position-index matrix for all pixels in the block is completed, wherein higher indices indicate greater distance from the original boundary of erroneous-height pixels (the border of the block).

The error correction circuit then replaces the provisional height values so assigned with corrected height values starting with pixels further removed from the original boundary of erroneous-height pixels (that is, starting with those pixels having the highest position index). A corrected height value is calculated for each such pixel by interpolation using provisional height values of adjacent pixels. In the calculation, position indices are used as measures of distance from the border of the block of erroneous-height pixels. The procedure is repeated for pixels having progressively smaller indices using originally valid as well as corrected height values in the computation until all provisional height values have been replaced by corrected height values. Since the procedure is based on valid height values at neighboring pixels, it guarantees that corrected height values consistent with a realistic surface map are assigned to each pixel in the block of erroneous height values.

Various other purposes and advantages of the invention will become clear from its description in the specification that follows, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

BRIEF DESCRIPTION OF THE DRAWINGS

FIGS. 18–21 illustrate the results produced by the method of the invention in restoring blocks of bad data points obtained by scanning a surface with an interferometer to measure and map its height profile.

DETAILED DESCRIPTION OF THE INVENTION

The method of this invention is designed to implement on-line restoration of erroneous or missing signals in an array of related digital electronic signals generated by a sensory device operating in raster fashion on a target-surface grid. In particular, the method has enabled the practical on-line restoration of missing portions of video images generated by interferometry and scanning-probe-microscopy surface-height profilers.

For example, interferometric profilers perform non-contact height measurements of delicate surfaces with excellent height resolution and high measurement speed. Among the various techniques that have evolved for optical testing, phase-shifting interferometry (PSI) and white-light vertical scanning interferometry (VSI) are well-known techniques used to obtain fast, three-dimensional profiles of smooth surfaces. For example, phase-shifting interferometry is founded on the basic concept of varying the phase difference between two coherent interfering beams of single wavelength in some known manner, such as by changing the optical path difference in discrete steps or linearly with time. Under such conditions, three or more measurements of the light intensity at a pixel of a receiving sensor array can be used to determine the initial phase difference of the light beams at the point on a test surface corresponding to that sensor pixel. Based on such measurements at each pixel, a phase distribution map can be determined for the test surface, from which very accurate height data are calculated.

Figure 1:
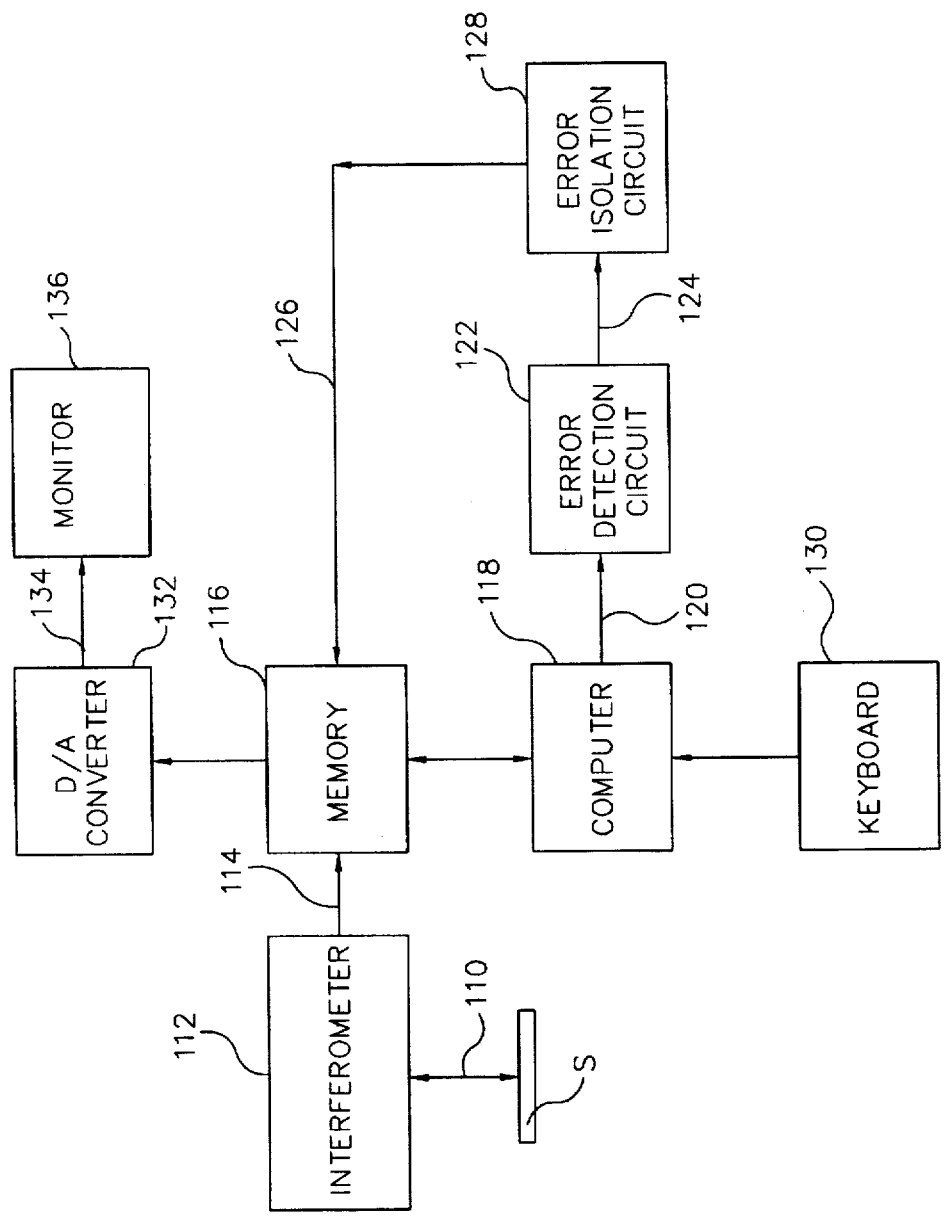
FIG. 1 is a schematic illustration of prior-art interferometric apparatus for generating a height map of a test surface.

In the prior art, as illustrated schematically in FIG. 1, the optical signals 110 generated by interferometric apparatus 112 operating on a test surface S are converted by an electronic detector (such as an array of charge-coupled-device cells) into digital electronic signals 114 that are stored in a memory 116 for access by a computer 118. Signals 114 are processed by computer 118 for calculating an array 120 of height values corresponding to each pixel mapping the test surface S. The array may also be stored in memory 116. Typically, each height value in the array 120 is tested by an error detection circuit 122 that identifies individual pixels having erroneous height values according to predetermined test criteria; and erroneous height values 124 are assigned a fixed, recognizable arbitrary value K (normally a very large number) in an error isolation circuit 128. The resulting height array 126 including such arbitrary values K is stored in memory 116 so that all erroneous-height pixels and blocks thereof may be easily recognized. Thus, the original array 120 of height values, having all erroneous height values identified and isolated, is available for statistical processing by computer 118 through a keyboard 130 or for conversion in a digital-to-analog converter 132 into an analog video signal 134 displayed on a monitor 136.

Figure 2:
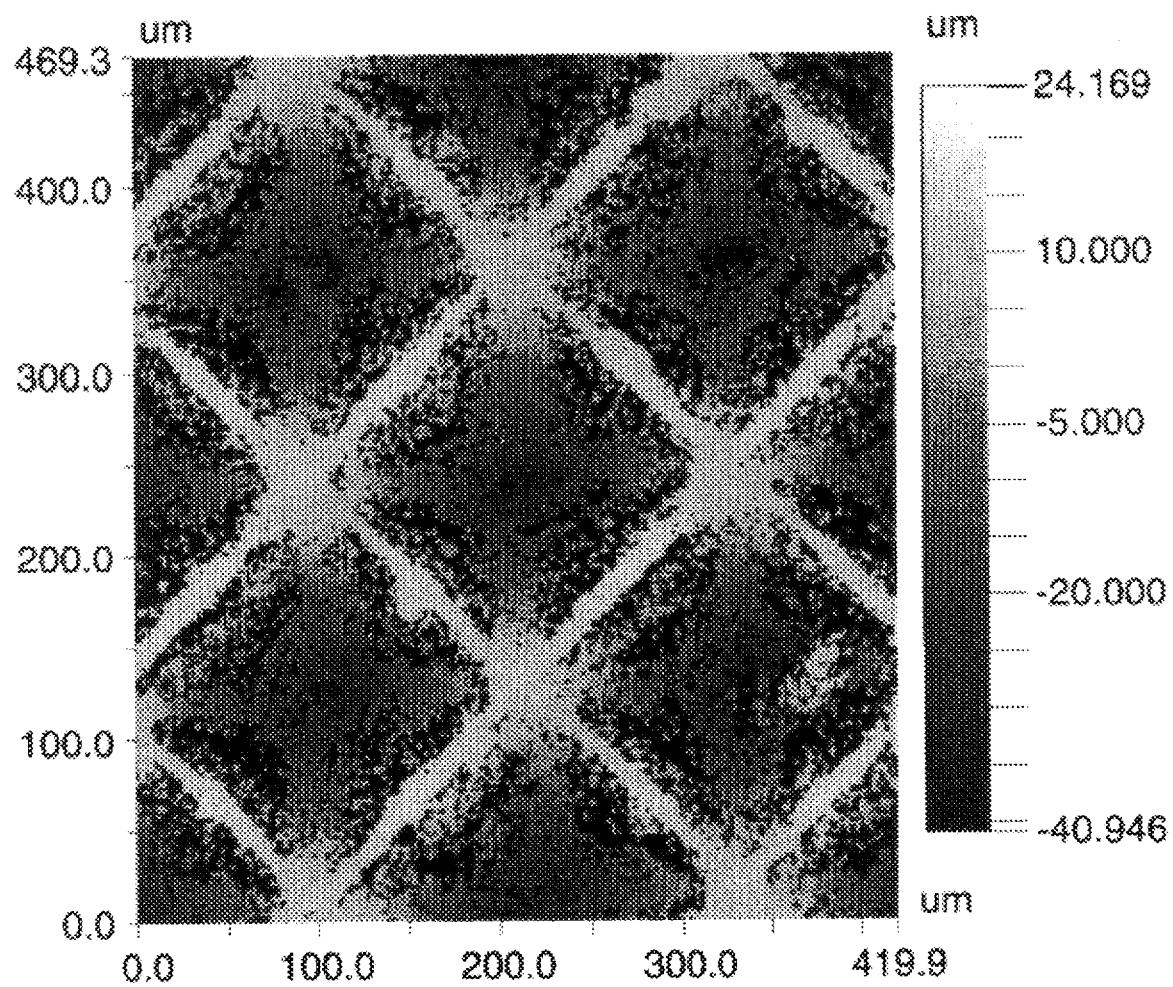
FIG. 2 is an illustration of a video image of a color-coded, two-dimensional height map of a print-roll surface, wherein darker areas correspond to lower heights and black areas represent erroneous-height pixels.
Figure 3:
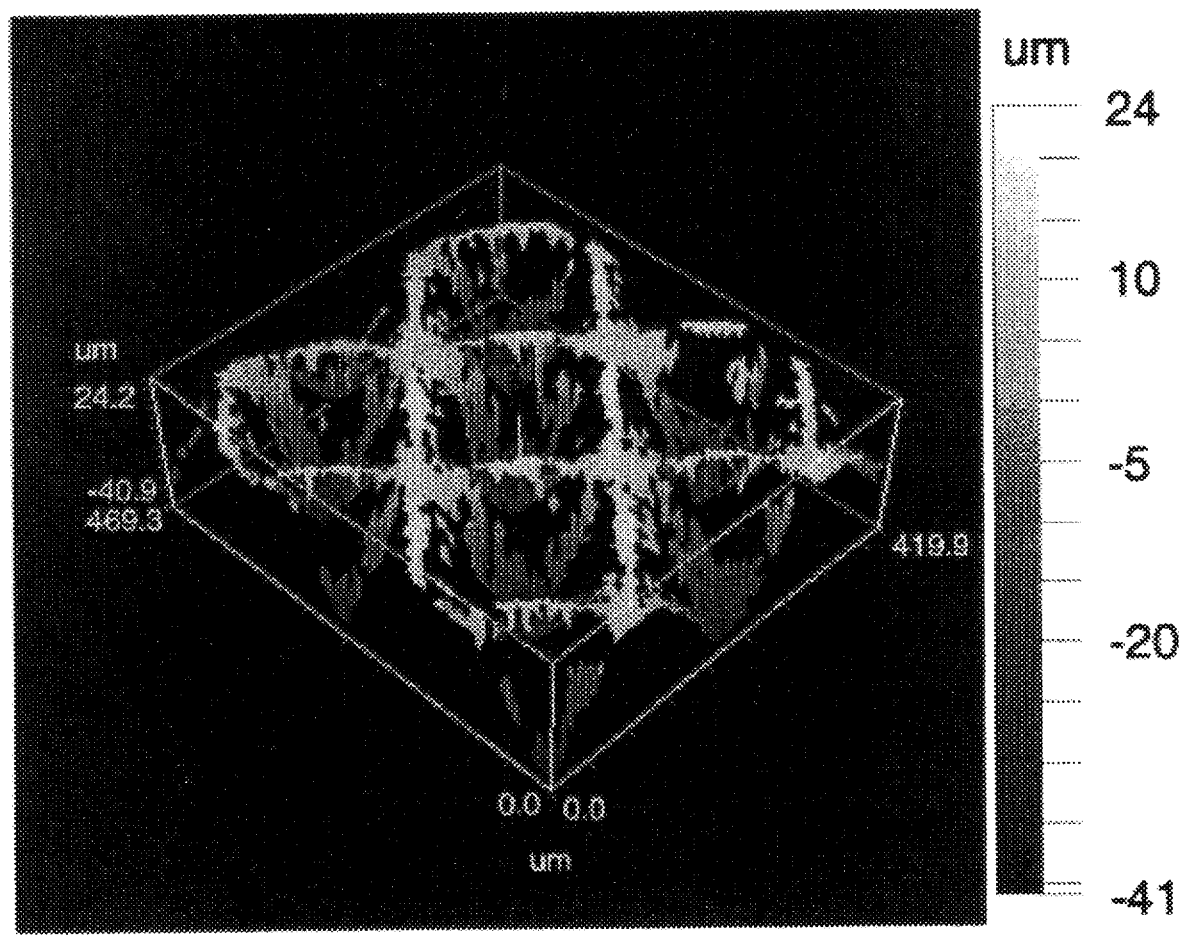
FIG. 3 is an illustration of a video image of a three-dimensional representation of the height map of FIG. 2 illustrating the profile of the test surface.

Normally, the height map corresponding to array 126 is displayed on-line while interferometric measurements are being performed. The height at each pixel is shown as a different color or a different intensity of black and white, black normally corresponding to bad data at erroneous-height pixels. FIG. 2 is an illustration of such a video image of a print-roll (anilox) surface, wherein darker areas correspond to lower heights (measured by the color-coded scale in the figure) in a two-dimensional height map, and black areas represent erroneous-height pixels. FIG. 3 is an image of a three-dimensional representation corresponding to the height map of FIG. 2, illustrating the profile of the test surface 10.

As seen in these illustrations, the pixels corresponding to missing or erroneous data (for the purposes of this disclosure the two are treated the same way) are shown with no indication of height, even though experience and common sense teach that the missing heights are likely to be close to the heights at adjacent pixels. As a result of this lack of information, statistical-analysis calculations cannot be performed and the usefulness of the interferometric procedure is greatly reduced. Therefore, the height restoration circuit of this invention not only provides an improved video image of the surface-height map, but also enables meaningful data analysis.

Figure 4:
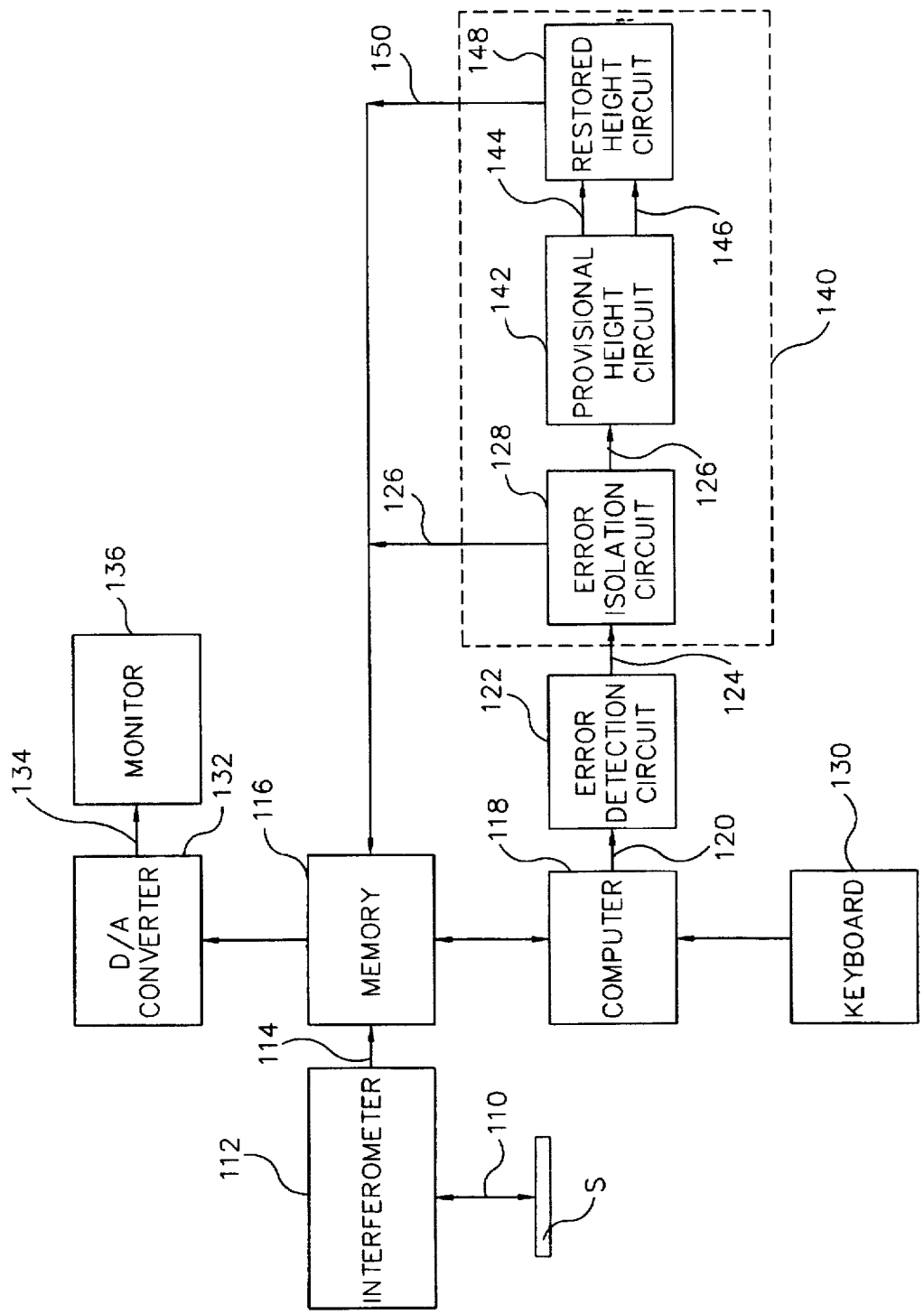
FIG. 4 is a schematic illustration of interferometric apparatus for generating a height map of a test surface including a height restoration circuit integrated with an error isolation circuit.

As illustrated schematically in FIG. 4, the restoration circuit 140 of the present invention is preferably integrated with the error isolation circuit 128 by operating on those pixels that have been assigned recognizable arbitrary values 126. As explained above, the array 120 constitutes a map of heights as sampled at different locations (pixels) throughout the target surface S and missing or clearly-erroneous data points need to be restored or corrected (the two functions are considered equivalent for the purposes of this disclosure) in order to provide suitable digital input for display or other processing apparatus. Missing or erroneous height values may be detected in the error detection circuit 122 by comparison of each measured height value with a threshold value expected for the height at any point on the particular surface S being tested. If a given value is missing or clearly wrong, it is substituted in the error isolation circuit 128 with a recognizable arbitrary value that identifies it as such for computer processing and display purposes. Because of the array format of the height map 126, the method of the invention is particularly suited for digital computer processing and is described herein with reference to standard two-dimensional matrix nomenclature. Thus, it is understood that all references to an element of a matrix are intended to refer to a corresponding pixel in a two-dimensional grid of a target surface.

After identification of blocks of pixels with erroneous height values, a provisional-height circuit 142 establishes erroneous-height-pixel boundaries between valid-height pixels and erroneous-height pixels at the border or borders of each block, and provisionally sets the height value for each erroneous-height pixel equal to the value of a pixel adjacent thereto. The circuit 142 also assigns a position index to each pixel to represent its distance from a border of the block containing it. Operating sequentially, erroneous-height pixels immediately adjacent to a valid-height pixel at a border are provisionally assigned a height value equal to that of such adjacent valid-height pixel and are assigned a position index 1, thus creating a new error-height-pixel boundary with provisional-height pixels. The procedure is repeated and erroneous-height pixels one pixel removed in the grid are provisionally assigned height values equal to those of adjacent provisional-height pixels along the newly established erroneous-height-pixel boundary and are assigned position index 2. The procedure is then repeated again and a new layer of erroneous-height pixels yet one pixel removed is provisionally assigned height values equal to those of adjacent provisional-height pixels (propagated during the prior step) and are assigned position index 3, etc., until all erroneous-height pixels in the block have been assigned a provisional height value equal to that of an adjacent pixel (whether originally valid or provisionally propagated during the prior step) and until a corresponding position-index matrix 144 for all erroneous-height pixels in the block is completed, wherein higher indices indicate greater distance from the block's borders. The procedure is repeated for every block of erroneous-height values in array 120. The provisional height values so generated are preferably saved by sequentially replacing erroneous height values in the array 120, so that an updated-height map 146, including the provisional height values, and a corresponding position-index matrix 144 are available for further processing in the restoration circuit 140.

A restored-height circuit 148 then replaces the provisional height values so assigned to each block of erroneous height pixels in array 120 with corrected height values starting with pixels further removed from the block's borders (that is, starting with those pixels having the highest position index). A corrected height value is calculated for each such pixel by interpolation using provisional height values of adjacent pixels. Position indices are used as measures of distance from the block borders (that is, from valid-height pixels). The procedure is repeated for pixels having progressively smaller indices using originally valid as well as corrected height values in the computation until all provisional height values have been replaced by corrected height values, thus producing a restored-height map 150 that is stored in memory 116 and made available for display in monitor 136 and/or further processing by computer 118.

For clarity of discussion, the following definitions are introduced for use throughout this disclosure. Erroneous height values are measured height values in array 120 found to be either missing or clearly incorrect by the error detection circuit 122; valid height values are measured height values in array 120 found to be acceptable for display and further processing; provisional height values are values in array 146 provisionally assigned to replace erroneous height values; and corrected height values are values produced by the restoration method and apparatus of the invention to permanently replace erroneous height values. Erroneous-height pixels are pixels in a grid P corresponding to erroneous height values; valid-height pixels are pixels in grid P corresponding to valid height values; and corrected-height pixels are pixels corresponding to corrected height values produced by the restoration method and apparatus of the invention. An erroneous-height-pixel boundary is a boundary between erroneous-height pixels and either valid-height pixels or corrected-height pixels.

Figure 5:
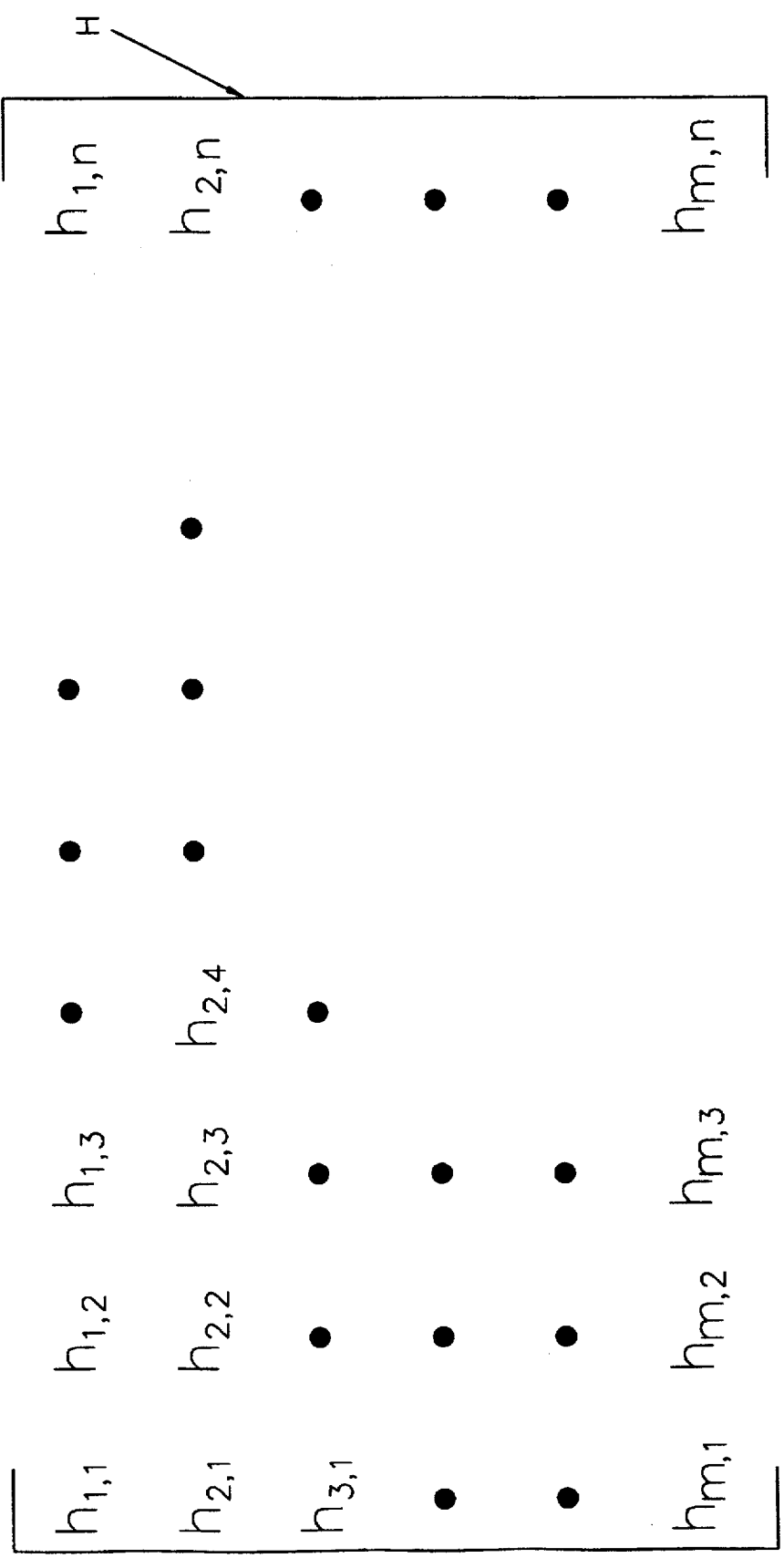
FIG. 5 is an example of a matrix of height data corresponding to a two-dimensional map of a surface grid, wherein each element in the matrix is a value for the height of the surface at a corresponding pixel in the grid.
Figure 6:
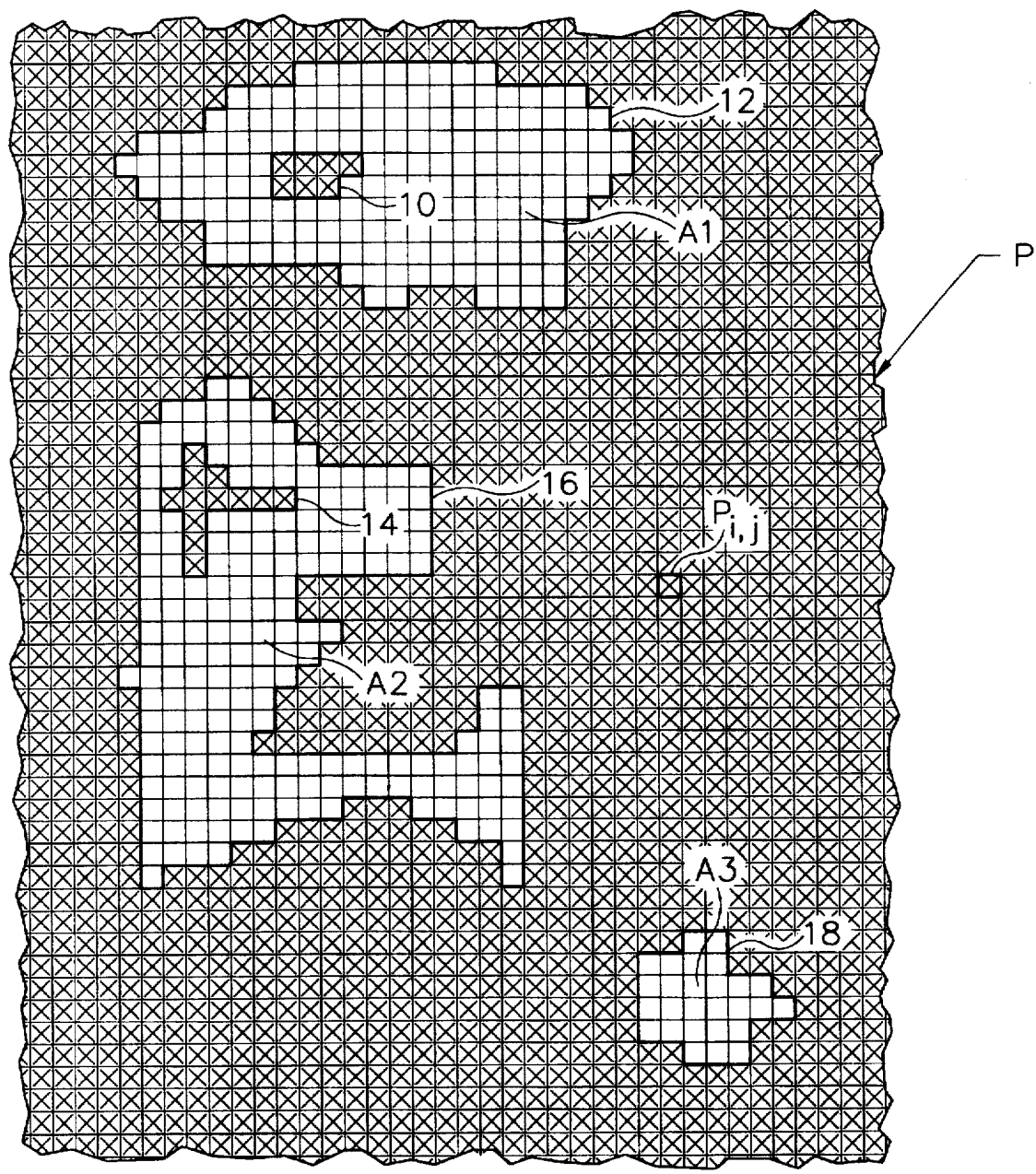
FIG. 6 is an illustration of a grid of a test surface wherein each pixel represents a finite area on the surface for which a height value is recorded as a corresponding element of the matrix of FIG. 5.

FIGS. 5 and 6 illustrate an mxn matrix H of digital signals corresponding to a two-dimensional mxn grid P of the target surface S. The value of each element $h_{i,j}$ (where i=1,m and j=1,n) in the matrix H represents the measure of the height at a corresponding pixel $p_{i,j}$ (where also i=1,m and j=1,n) in the grid P. The regions A1 between boundary lines 10 and 12, A2 between boundary lines 14 and 16, and A3 within boundary line 18 in FIG. 6 illustrate adjoining pixels in three blocks of pixels in the target grid P for which height data are missing, as may result from equipment malfunction or other error, thus creating corresponding discontinuities in the elements of the matrix H. These missing heights need to be restored before the matrix H can be fully utilized for display or data processing.

Figure 7:
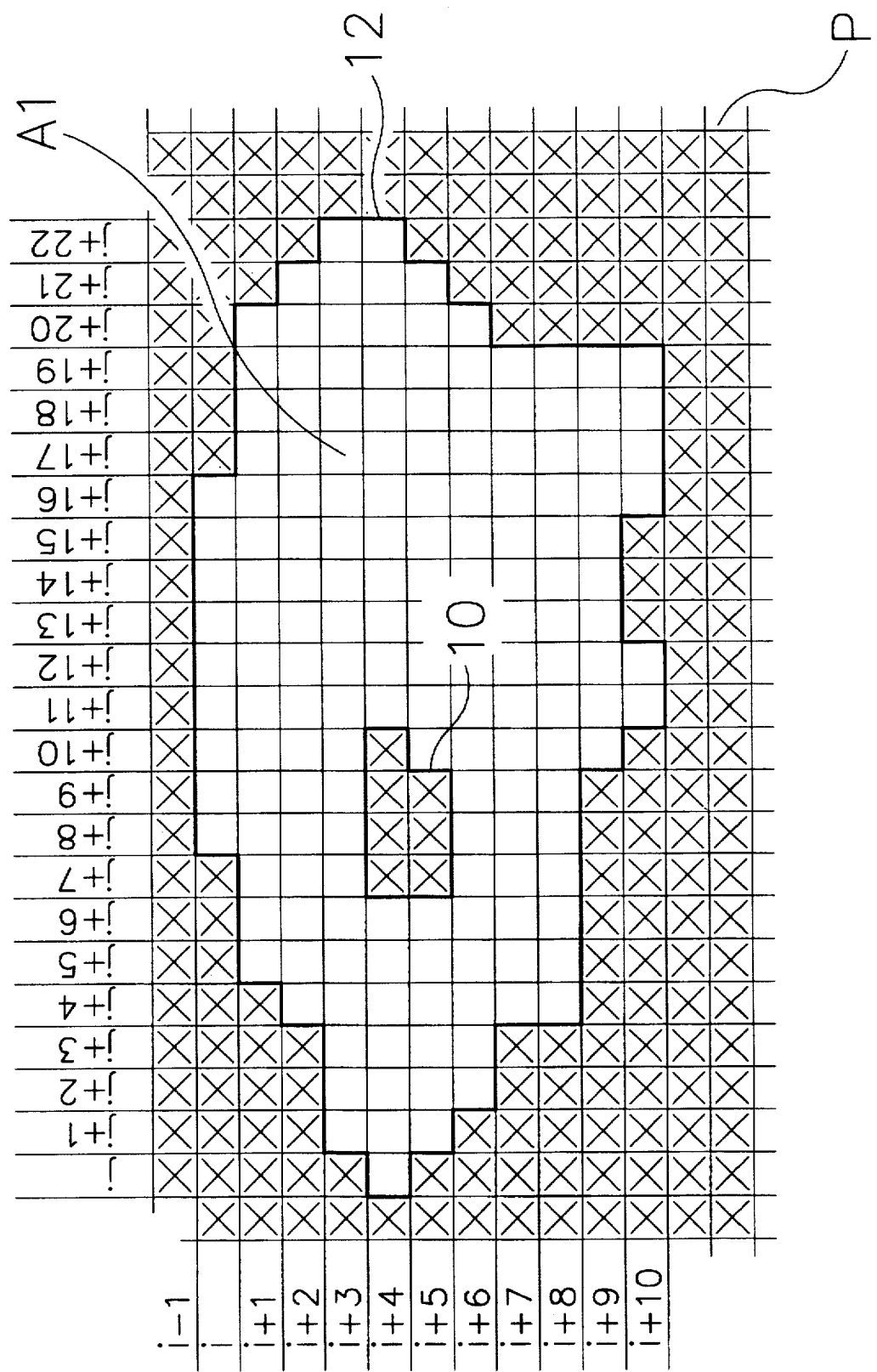
FIG. 7 is a grid of a detailed portion of the surface of FIG. 6 wherein pixels corresponding to missing data points (erroneous-height pixels) are illustrated among pixels for which data points are known (valid-height pixels).

FIG. 7 is a detailed representation of region A1 in FIG. 6 and this block of pixels is used to illustrate the height-restoration method of the invention. The same procedure would apply in the same manner to restore height data for any region of a surface grid for which height data are missing. Note the one-to-one correspondence between pixels and matrix elements in the drawings inasmuch as each pixel $P_{i,j}$ (i=1,m and j=1,n) represented by a square in FIG. 7 corresponds to an element $h_{i,j}$ (i=1,m and j=1,n) in matrix H, so that the location of each pixel can be identified by the row and column subscripts of a corresponding element in the matrix. Thus, references to pixels and matrix elements are used interchangeably in this description.

The region A1 bound by lines 10 and 12 in the illustration of FIG. 7 (included between rows i and i+10 and columns j and j+22) is assumed, for example, to contain pixels for which no reliable heights are available. These pixels are shown in blank for ease of illustration, while surrounding pixels are shown with an X to indicate that a valid height value is available. As mentioned above, this condition may be determined by a threshold test in an error detection circuit, such as insufficient signal intensity or excessive deviation from the values of proximate heights. As such, lines 10 and 12 define erroneous-height-pixel boundaries between valid-height pixels outside the region A1 (shown marked with an X) and erroneous-height pixels within the region A1 (shown in blank).

Figure 8:
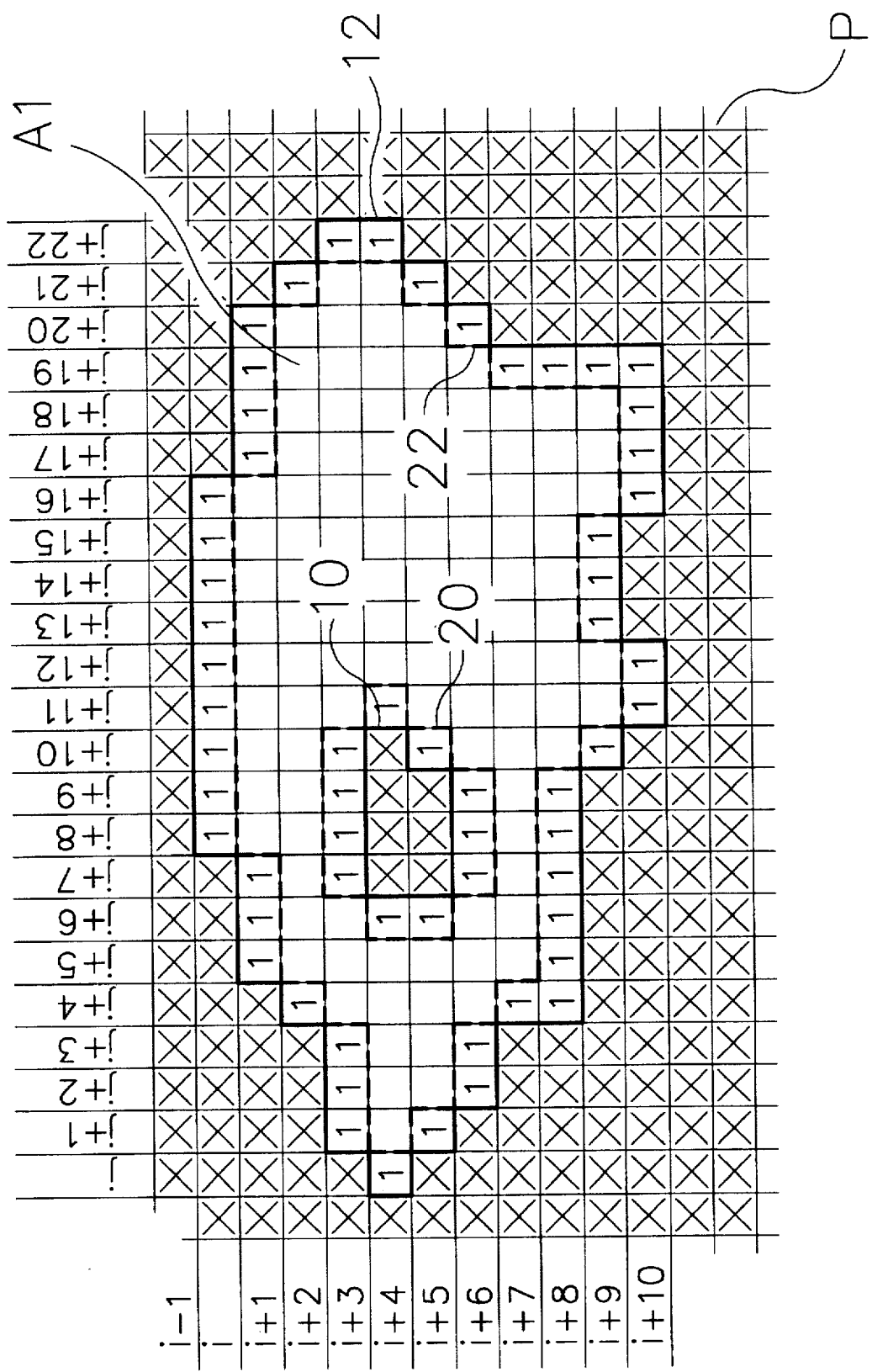
FIG. 8 illustrates the method of the invention as applied to restore the erroneous height values in the detailed grid of FIG. 7, showing pixels adjacent to valid-height pixels being identified by an index representative of the pixel distance from a border of the block.

The first step of the method of the invention requires that each element in the matrix M corresponding to a pixel inside the area A1 be identified and assigned a provisional value and a position index representative of its distance from the boundaries 10 and/or 12 of valid-height pixels. Given the two-dimensional nature of the region, the procedure can be applied in equivalent manner by sequentially scanning the matrix M either horizontally (that is, row by row) or vertically (column by column). Part of the first step, performed by the error detection circuit 122, identifies all erroneous-height pixels adjacent to at least one valid-height pixel along boundaries 10 and 12 (either horizontally or vertically). Note that each pixel in the grid P consists of a quadrilateral with four sides; accordingly, pixel adjacency, as used herein, is defined as contiguity between pixels either horizontally or vertically through their sides. For example, scanning row i from left to right in FIG. 7, it is apparent that pixel $p_{i,j+8}$ is the first pixel for which reliable information is missing. Accordingly, that pixel is identified as such and indexed by an index representative of its position with respect to the boundary 12, such as 1, for example, to signify that the pixel is one pixel removed from one of its nearest valid-height pixels (in this instance, from either $p_{i,j+7}$ or $p_{i-1,j+7}$). At the same time the corresponding element $h_{i,j+8}$ in the matrix H is set to a provisional height value equal to the valid height value of an arbitrarily-chosen adjacent pixel, such as $h_{i,j+7}$ or $h_{i-1,j+7}$ in the illustration. I found that the method is not materially affected by the choice of any particular one of the adjacent known values; thus, the choice may be carried out arbitrarily in a way that is computationally advantageous, such as the first adjacent known value that is available for use. In the illustration at hand, wherein row i is being scanned, $h_{i,j+8}$ could efficiently be set equal to $h_{i,j+7}$, the last known value processed by the computer during its scanning of the row. Similarly, pixel $p_{i,j+9}$ is also assigned the same position index 1 because it is also one pixel removed from the boundary 12, having a valid-height pixel $p_{i-1,j+9}$ adjacent to it; thus, the corresponding element $h_{i,j+9}$ in matrix H is provisionally set equal to the value of $h_{i-1,j+9}$; and so on for all missing elements in row i. Pixel $p_{i,j+16}$, which is also one pixel removed from the boundary 12 (in two directions, above and to the right), is also assigned position index 1 and the corresponding element $h_{i,j+16}$ in matrix H is provisionally set equal to the value of one of the adjacent known height values, arbitrarily chosen between $h_{i-1,j+16}$ and $h_{i,j+17}$. Repeating the procedure for all rows, all pixels adjacent to either boundary 10 or 12 (horizontally or vertically) are thus identified and indexed, and all corresponding elements of matrix H are assigned provisional values. FIG. 8 shows a map of the position indices assigned to the various pixels along the boundary 12 during this step of the method of the invention.

Note that a matrix D of position indices $d_{i,j}$ (i=1,m; j=1,n), which is referenced by numeral 144 in FIG. 4, would obviously consist of an array corresponding to the grid shown in FIG. 8, wherein each element of the matrix is the position index for the corresponding pixel in the grid P. Therefore, the grid P itself is used in the figures to illustrate the values of the position index matrix D. Thus, computationally, only two arrays of data (the matrices H and D) need be updated and carried forward during processing.

After this step is accomplished, all pixels so identified and indexed are treated as having acquired a valid value (the provisional value assigned to each element in matrix H corresponding to each indexed pixel). Accordingly, a new erroneous-height-pixel boundary is established corresponding to the contour defined by the indexed pixels, as indicated by broken lines 20 and 22 in FIG. 8. The second step of the method of the invention is a repetition of the same procedure for the next layer of pixels having missing height values. The boundaries 20 and 22 defined by the pixels indexed during the first step are treated as the new boundaries of the region containing erroneous height values; and the provisional values set for the corresponding elements in matrix H are treated as valid height values for the purpose of assigning provisional height values to a new layer of pixels further removed from boundary lines 10 and 12. Note that these pixels are now two pixels removed from valid-height pixels along lines 10 and 12; as such, a representative position index, such as 2, is used in the illustration.

Figure 9:
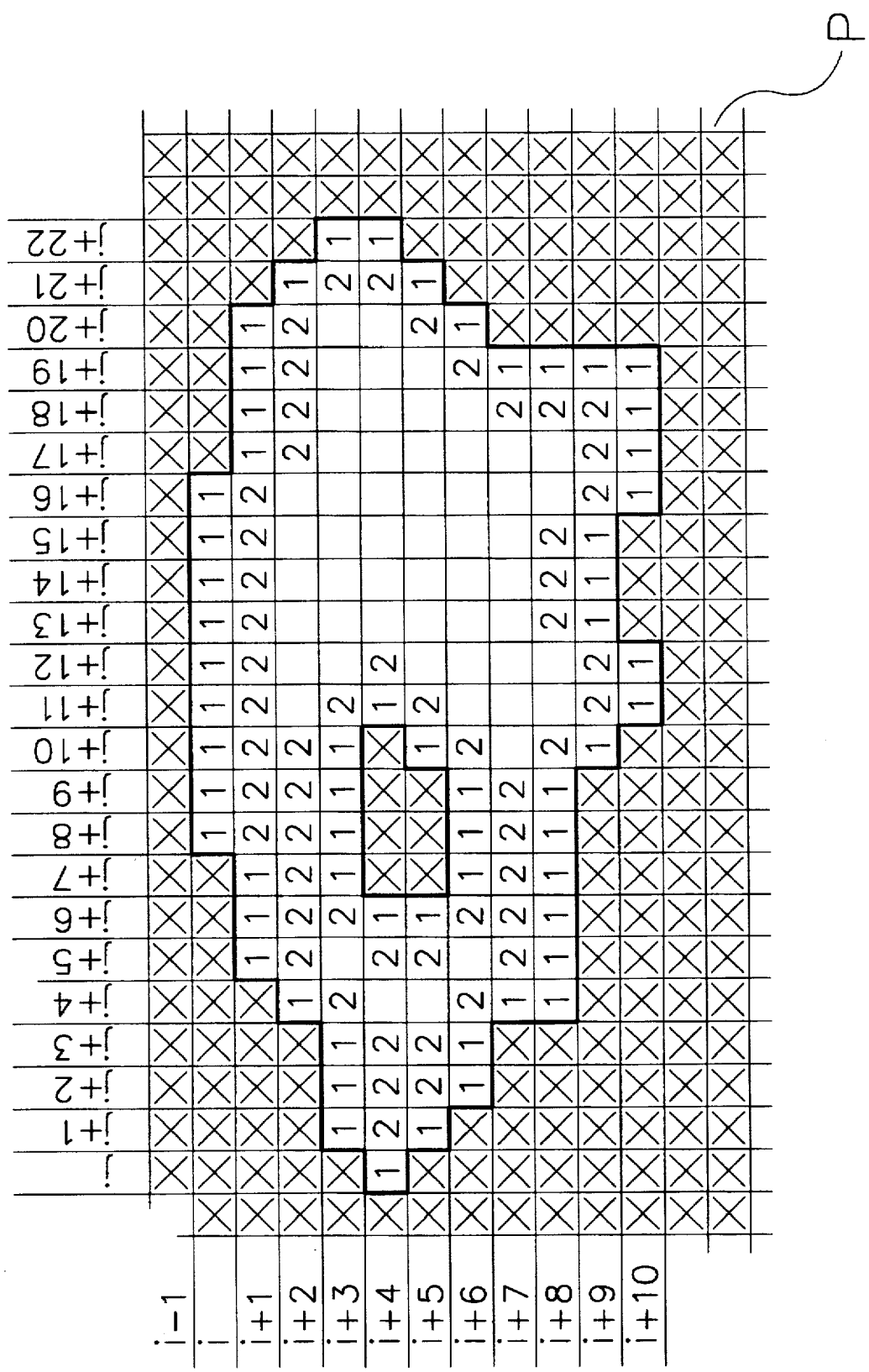
FIGS. 9–13 illustrate the sequential steps of the method of the invention whereby all erroneous-height pixels are identified by an index representative of the pixel distance from a border of the block and are assigned a provisional height value.
Figure 10:
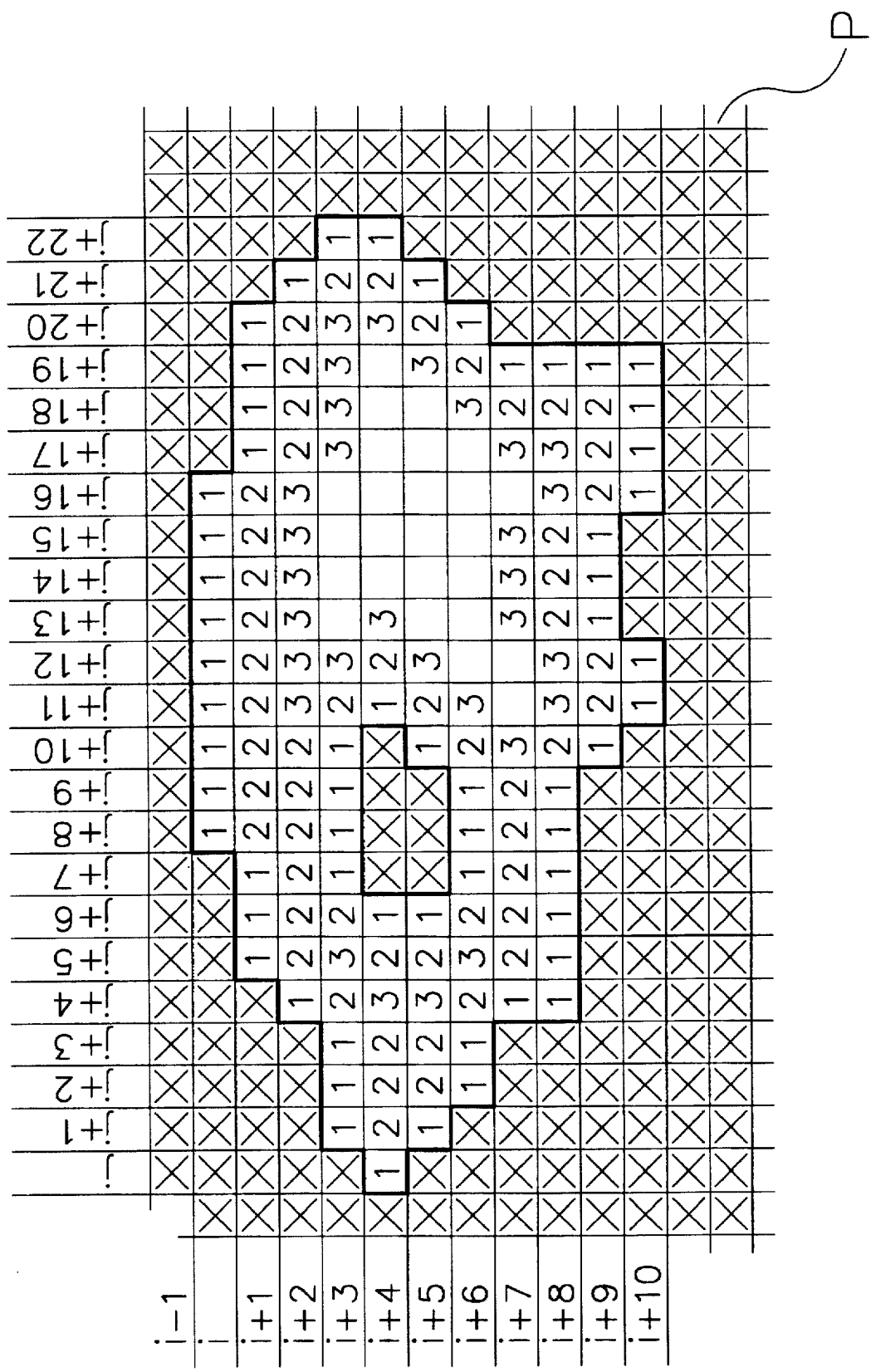
Figure 11:
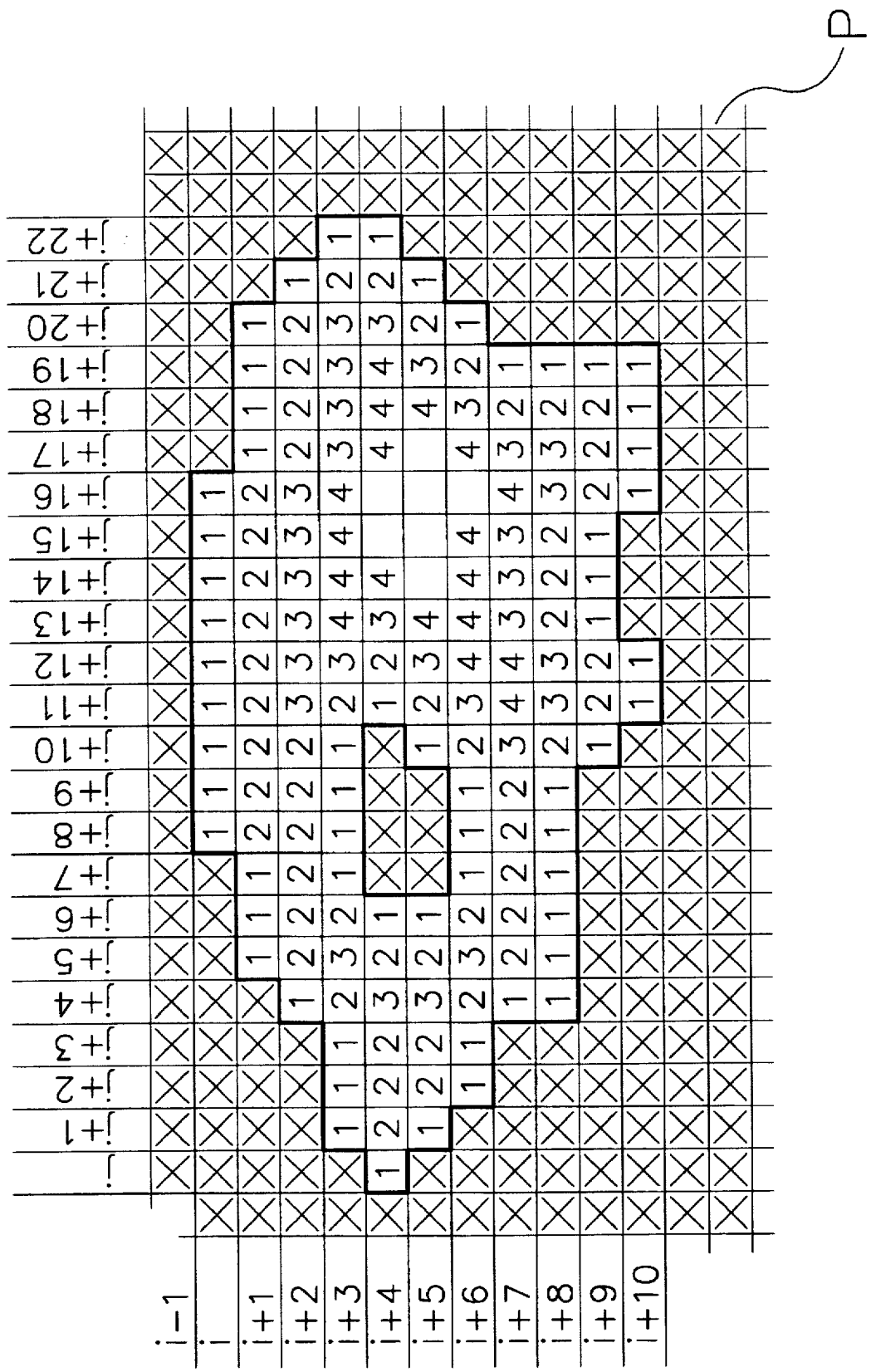
Figure 12:
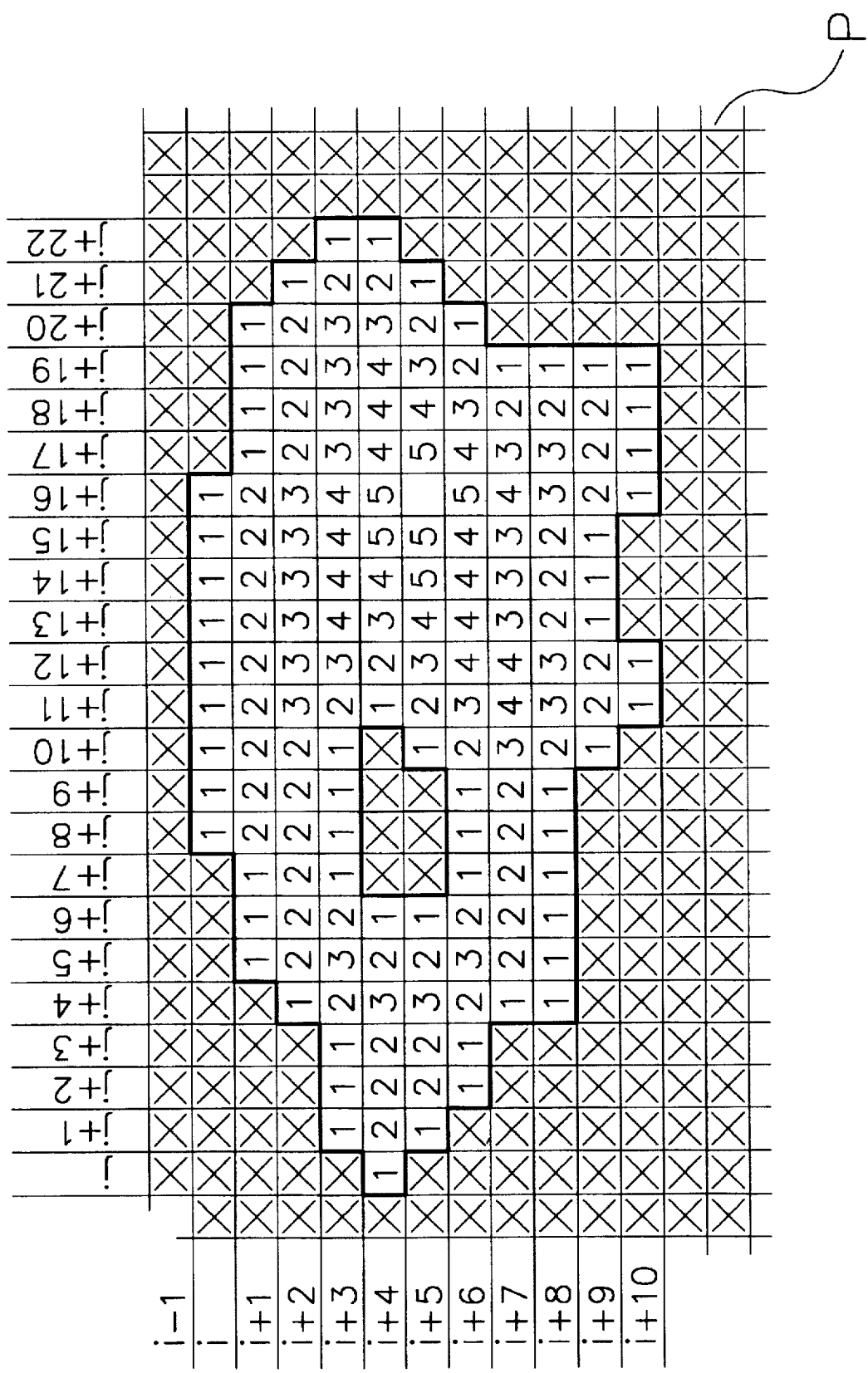
Figure 13:
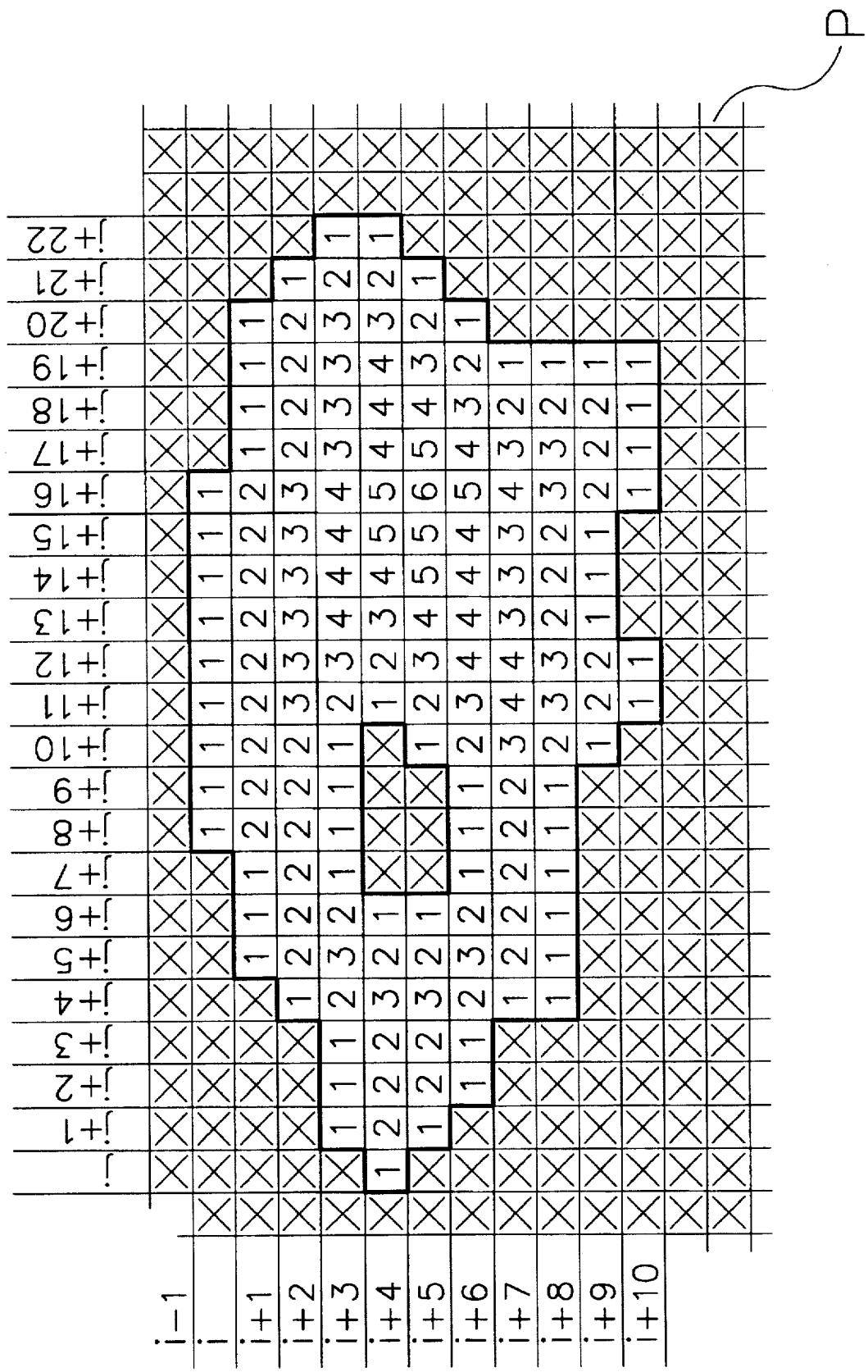

Continuing scanning of region A1 shows that pixel $l_{i+1,j+8}$ is adjacent to the new erroneous-height-pixel boundary 22; accordingly, it is identified and indexed by a new position index 2. It is noted that all pixels in row i+1 are adjacent to at least one pixel indexed by 1; therefore, the entire row of erroneous-height pixels is assigned position index 2, signifying that each pixel in the row is two pixels removed from the border line 12. At the same time, each corresponding element in matrix H is set equal to an adjacent known value (which may be a valid height value or a provisional height value, as applicable); or, if more than one adjacent value is available, the element is set equal to one arbitrarily chosen among them. For example, $p_{+1,j+8}$ is assigned index 2 and $h_{i+1,j+8}$, the matrix H element corresponding to pixel $p_{i+1,j+8}$, is assigned a value equal to that of an adjacent pixel, such as $h_{i+1,j+7}$ or $h_{i,j+8}$. Repeating the procedure for all rows, all pixels adjacent to pixels indexed 1 (in either direction) are thus identified and indexed 2, and a provisional value is assigned to each corresponding element of matrix H. FIG. 9 shows a map of the corresponding indices assigned to the various pixels during the second step.

The procedure is repeated in successive steps until all erroneous-height pixels are assigned position indices corresponding to their position in the region relative to the boundary lines 10 or 12. At the same time, provisional values are assigned to all corresponding elements in the matrix H. As a result of this procedure, the valid height values at the boundaries of the region A1 are propagated inward to provisionally establish a height value for all erroneous height values. FIGS. 10–13 illustrate the indices assigned to the various blank pixels of region A1 in the example as a result of each step. Note that pixel $p_{i+5,j+16}$ has index 6, the highest position index in the example, reflecting the largest distance of any pixel from a valid-height pixel surrounding region A1. Once all pixels corresponding to erroneous height values are so identified and indexed, and provisional values are set for all corresponding elements in the height-data matrix H, the method of the invention has generated the information necessary to restore all erroneous height values in matrix H by replacing provisional height values with calculated, corrected height values.

The data restoration procedure implemented by the restored-height circuit 148 works sequentially in reverse, starting with pixels having highest indices in the middle of each block of erroneous height values, such as A1, and propagating outward toward the boundaries 10 and 12. Thus, in the example at hand, the first restored data point is $h_{i+5,j+16}$, corresponding to the highest-index pixel $p_{i+5,j+16}$, which has position index 6. The procedure is illustrated here with reference to this pixel, but the same steps are carried out for each pixel to be restored. The height values (either valid or provisional) for all pixels adjacent to the pixel being restored are surveyed and the lowest and highest values are retained for interpolation purposes, regardless of their precise positions with respect to that pixel. For example, the low and high values among $h_{i+5,j+15}$, $h_{i+4,j+16}$, $h_{i+5,j+17}$ and $h_{i+6,j+16}$ are used for pixel $p_{i+5,j+16}$. Assume, for illustration, that these values are 30, 101, 98 and 56 for $h_{i+5,j+15}$, $h_{i+4,j+16}$, $h_{i+5,j+17}$ and $h_{i+6,j+16}$, respectively. Then, 30 and 101, the low and high values, are selected for interpolation. Note that the values at pixels positioned diagonally with respect to the pixel under consideration could be used as well (that is, a total of eight values instead of four), but I found that the added computational complexity does not warrant this approach.

The calculation of each corrected height value is made by interpolating between the two selected height values as a function of the distance of their pixels from the closest boundary (i.e., 10 or 12 in A1), such distance being measured by the position index assigned to each pixel. Since the pixel being processed is one pixel removed (adjacent) from the ones whose height values are being used for interpolation, the latter pixels' position indices are augmented by one to reflect the additional distance required to reach the pixel being restored.

Figure 14:
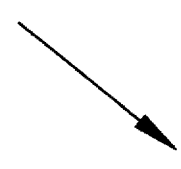
FIG. 14 is an enlarged partial view of the portion of region A1 in FIG. 6 containing a pixel with highest position index and illustrating provisional height values at to pixels adjacent thereto.

For example, FIG. 14 illustrates an enlarged view of a small portion of region A1 wherein each pixel shows its provisional height value (in the bottom portion of the pixel) and its position index (in the top portion of the pixel). The provisional height value 30 is the value of $h_{i+5,j+15}$ (corresponding to pixel $p_{i+5,j+15}$ with index 5) and 101 is the value of $h_{i+4,j+16}$ (corresponding to pixel $p_{i+4,j+16}$, also with index 5). Therefore, the distance of pixel $p_{i+5,j+16}$, for which the height value is being restored, from the surrounding boundary lines (10 and/or 12) is equal to the distance (measured by the position index) of each such adjacent pixel from the nearest boundary plus one (that is, 5 in both cases plus 1, for a total of 6 steps in both directions). Accordingly, the corrected value is calculated as follows:

$$h_{i+5,j+16} = 30 + \frac{6}{(6+6)} (101 - 30) = 30 + 35.5 = 65.5.$$

Note that, although belonging to separated matrices H and D, the heights and position indices are shown together in the grid P for ease of illustration.

After restoration of a first corrected height value, the same procedure is applied to all pixels having highest index. Then, sequentially, to all pixels having progressively smaller indices until all provisional height values are substituted with corrected height values all the way to the region's boundaries 10 and 12.

Thus, in the example being illustrated, first all pixels having index 5 are restored, then 4, 3, etc. As each corrected height value is assigned to a restored pixel, it becomes available as a value for consideration in selecting the high and low values of adjacent pixels for subsequent restoration steps. In addition, the corrected height values are treated as valid height values and the pixels associated with them are considered valid-height pixels. Accordingly, each restored pixel is assigned position index zero for use in subsequent restoration steps.

In general terms, the corrected height value for any given pixel is calculated by the following equation:

$$h(\text{corrected}) = \quad (1)$$

$$h(\text{min}) + \frac{ind(\text{min}) + 1}{[ind(\text{min}) + ind(\text{min}) + 2]} [h(\text{max}) - h(\text{min})]$$

where h(corrected) is the corrected height value produced by the restoration circuit 140 for a given pixel; h(min) is the minimum among valid, provisional or corrected height values of adjacent pixels; h(max) is the maximum among valid, provisional or corrected height values of adjacent pixels; ind(min) is the position index of the pixel corresponding to h(min); and ind(max) is the position index of the pixel corresponding to h(max).

After all highest-index pixels in a region have been processed using this (in the illustration, only one pixel has index 6), the procedure is performed sequentially on all pixels having the next highest index (5 in the illustration). As mentioned, the method of the invention utilizes the same general equation given above and the corrected height value for each restored pixel is used together with provisional height values (and also with actual, valid height values when restoring a pixel adjacent to valid-height pixels at the region's border) to select high and low entries h(max) and h(min), respectively, for the calculation. Each restored pixel is assigned position index 0, so that the distance between it and an adjacent pixel is correctly represented in the equation by 0+1=1; i.e., one pixel removed.

Figure 15:
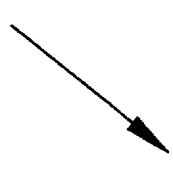
FIG. 15 is a representation of the information in FIG. 14 expanded to include the results of the height restoration procedure for the pixel with such highest position index and to illustrate the mechanics for restoring the height value for pixels having progressively lower position indices.

FIG. 15 is a representation of the height values of FIG. 14 expanded to include the results of the first interpolation and an illustration of the mechanics of the second interpolation. The corrected height value corresponding to the pixel originally having index 6 ($p_{i+5,j+16}$), that was just restored, is shown in the pixel in parenthesis (65.5) with its new position index 0. Applying the method to a pixel having index 5 such as $p_{i+5,j+15}$, for illustration, we see that it is adjacent to pixels $p_{i+5,j+14}$, $p_{i+4,j+15}$, $p_{i+5,j+16}$ and $p_{i+6,j+15}$. The corresponding height values in matrix H (at the bottoms in the pixels) are found to be 41 (provisional), 35 (provisional), 65.5 (corrected) and 50 (provisional) for $p_{i+5,j+14}$, $p_{i+4,j+15}$, $p_{i+5,j+16}$ and $p_{i+6,j+15}$, respectively; and the corresponding position indices are 5, 5, 0 and 4, respectively. Thus, the minimum and maximum adjacent values are 35 and 65.5, corresponding to $p_{i+4,j+15}$ and $p_{i+5,j+16}$, with indices 5 and 0, respectively. The distance ind(min) corresponding to the provisional height value 35 (for $p_{i+4,j+15}$) is 5+1=6; while the distance ind(max) corresponding to the corrected height value 65.5 (for $p_{i+5,j+16}$) is 0+1=1. Applying the general equation (1) given above, the restored value for $h_{i+5,j+15}$ is calculated as follows:

$$h_{i+5,j+15} = 35 + \frac{6}{(6+1)} (65.5 - 35) = 35 + 26.1 = 61.1.$$

The procedure is repeated for each pixel in the region, thus allowing the correction of all provisional height values by sequentially addressing all pixels originally corresponding to erroneous height values. I found that the method of the invention produces smooth corrected height values for restored pixels, well within the expectation prescribed by surrounding (measured) valid height values. It produces realistic results irrespective of the shape and size of the region of missing data, such that it would be equally efficient for regions shaped like A2 and A3 in FIG. 6. The method is computationally simple and fast, allowing for on-line computer applications without need for special hardware. Any personal computer system is suitable to provide the processing hardware necessary for implementing the invention. Note that arbitrary choices can be made to take care of special situations during computation. For example, if two height values are found to be equal during the selection of a minimum or a maximum adjacent value, I found no critical difference in the results obtained using either choice, even though the two values may correspond to pixels having different position indices. Accordingly, the simplest computational choice, such as the use of the last value stored in memory, is preferred.

Figure 16:
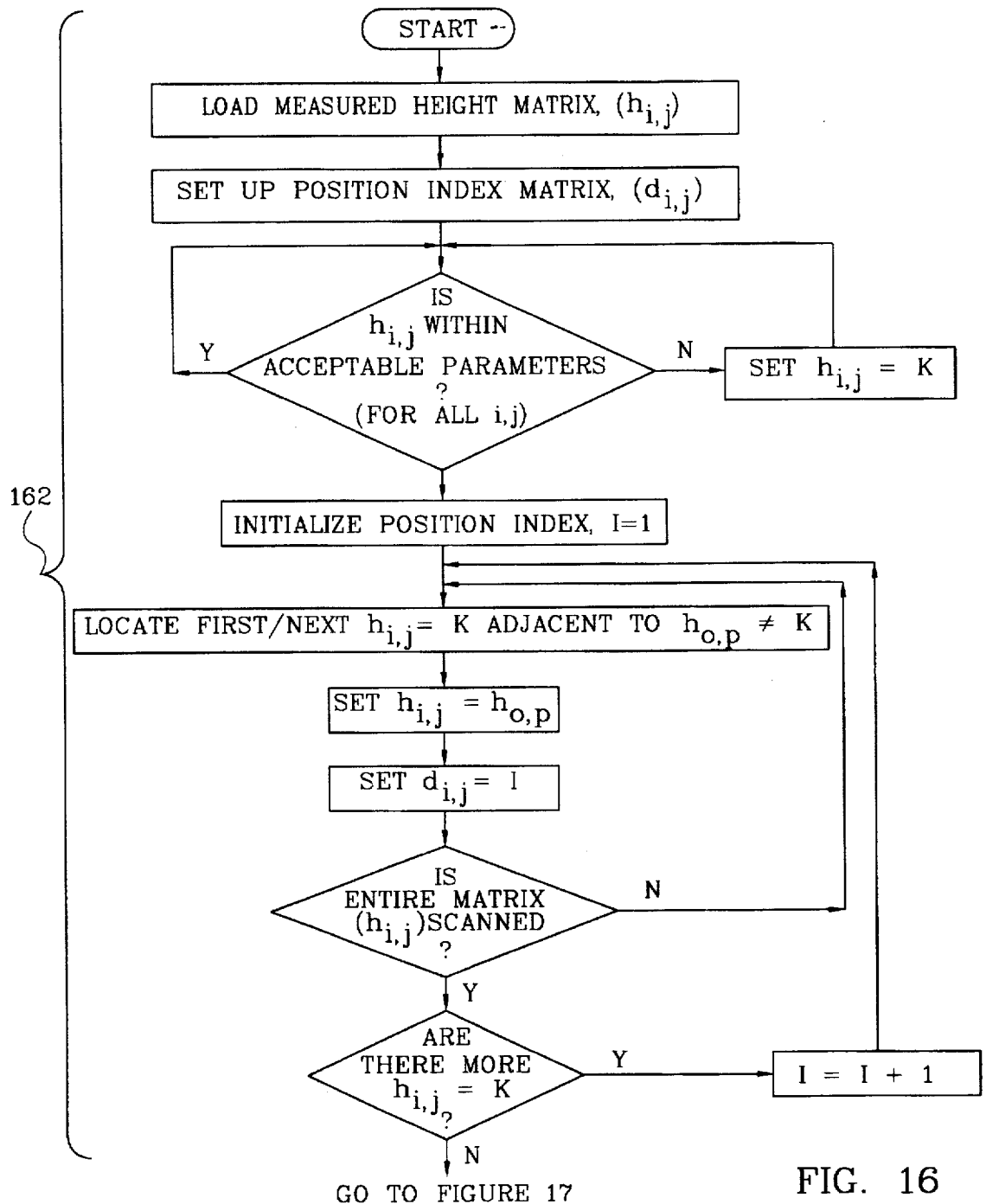
FIGS. 16 and 17 are a flow chart of the preferred procedure followed in implementing the technique of the invention with the use of a computer.
Figure 17:
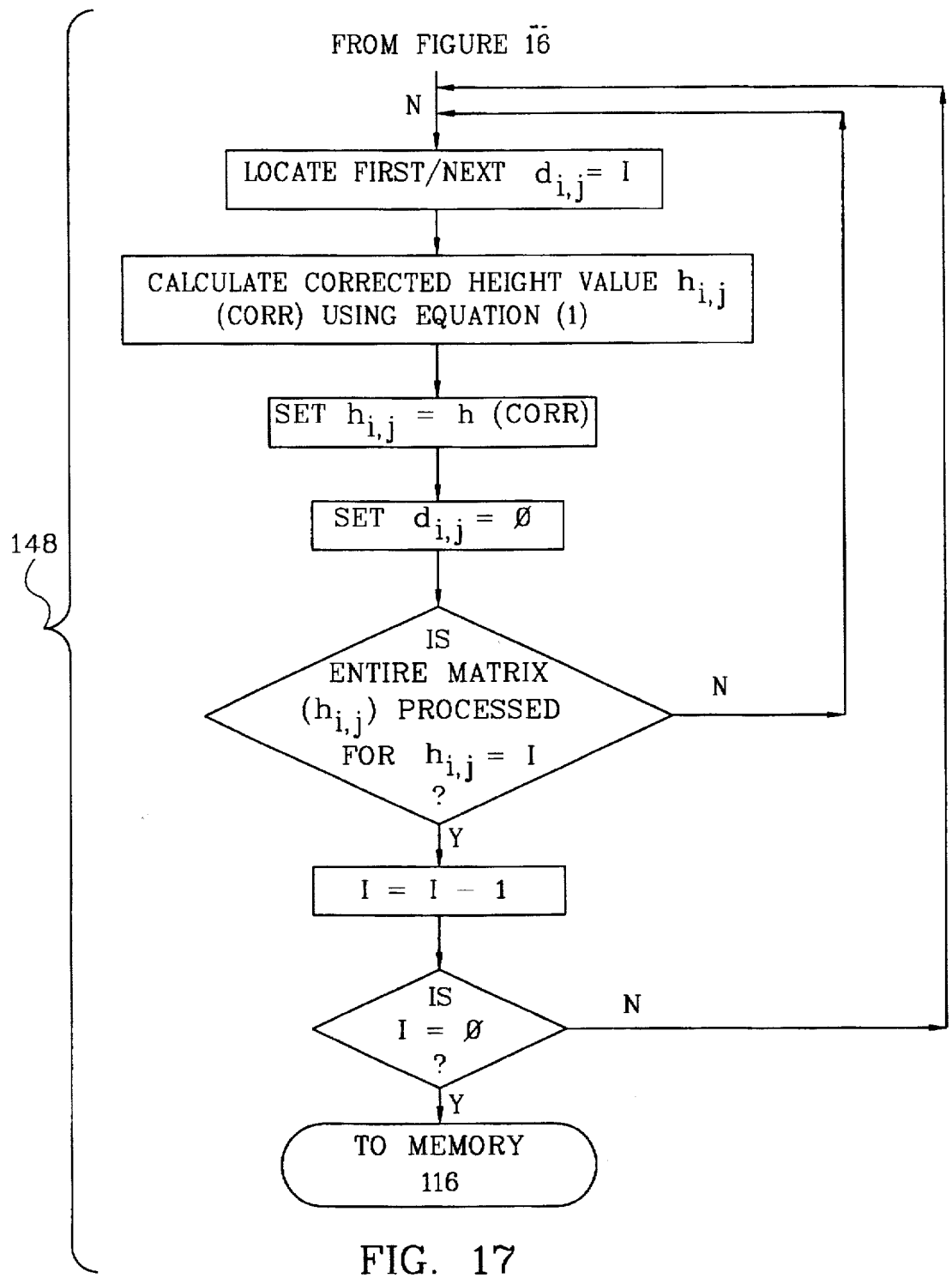

FIGS. 16 and 17 are a flow chart of the preferred procedure followed in implementing the invention with the use of a computer. Only two equal-size, two-dimensional matrices need to be stored at all times. The first one is an input matrix H [which by convention may also be represented by $(h_{i,j})$] of raw height values 120 calculated by the computer 118 from the digital electronic signals 114 produced by the interferometric apparatus 112 scanning a test surface T (see FIG. 4). Each element h of this matrix, which has a one-to-one correspondence with a pixel $p_{i,j}$ in a test-surface grid, is tested against a threshold value to determine its viability as a good height value. If the value is not good, the element h is changed to a recognizable arbitrary value K in the matrix H.

The second matrix D [also conventionally represented by $(d_{i,j})$] is a position index matrix, wherein each element d corresponding to an erroneous height value in matrix M is assigned a position index (1, 2, 3, ...) as outlined above. These indices are first set by repeating the procedure away from the boundaries of valid height values, and then updated toward the boundaries as data points are being corrected. The same matrix D is used at all times as a current source of position information for the calculation. As corrected height values are calculated to restore pixels in the regions of erroneous height values, they are stored currently in matrix M and replace previous values, which are no longer needed. After the procedure is completed, matrix H contains only original good data (valid height values) and restored data (corrected height values).

FIGS. 18 through 21 illustrate the results produced by the method of the invention in correcting bad height data points obtained by scanning a surface with an interferometer to measure surface roughness. FIG. 18 shows a measured height map (an example of array H) containing rows 1–18 and columns 1–18 based on a portion of original data, wherein erroneous height values are represented by the word BAD after processing in the error isolation circuit 128. FIGS. 19 and 20 show corresponding position-index and provisional-height matrices generated by the provisional-height circuit 142 of the invention; and FIG. 21 shows a corrected-height map after all erroneous height values have been corrected according to the procedure of the invention.

Figure 22:
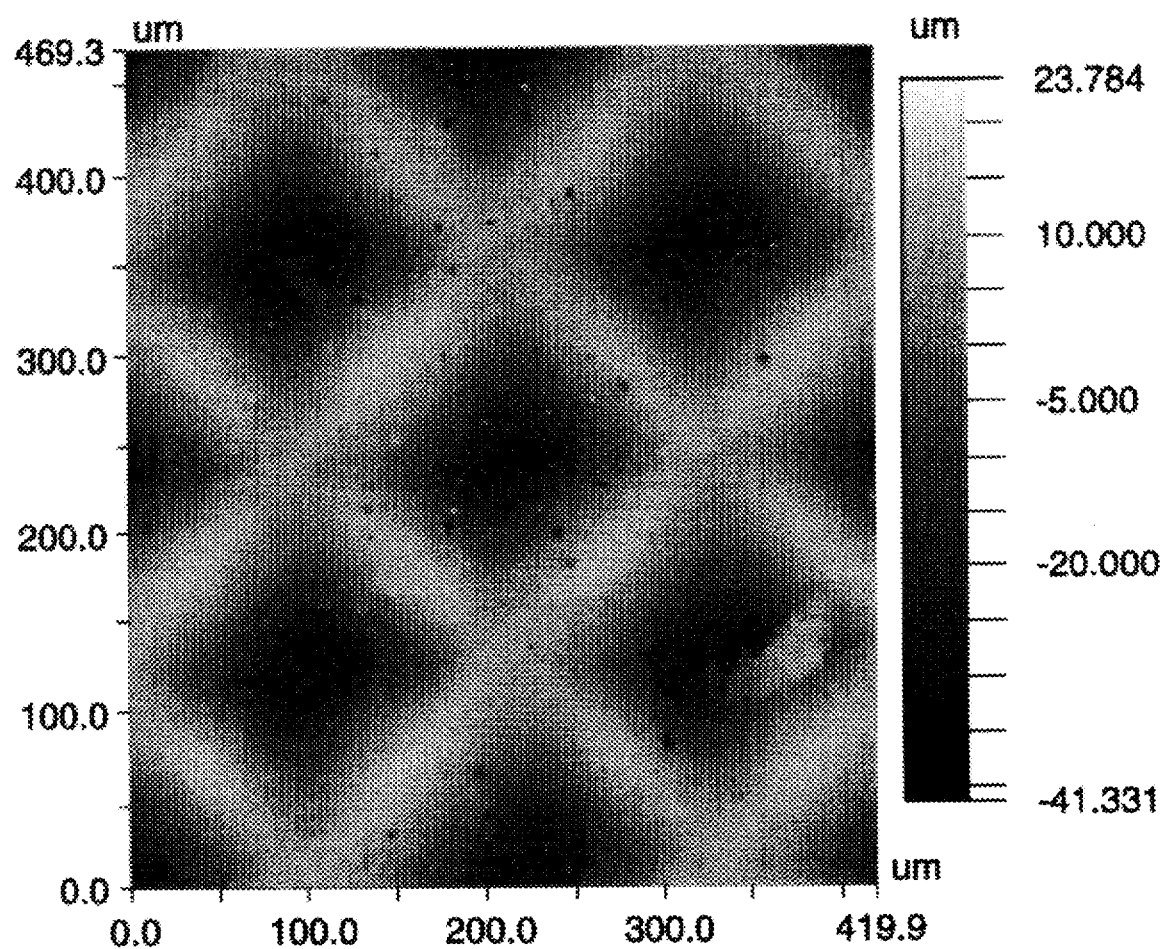
FIG. 22 is an illustration of a video image of the color-coded, two-dimensional height map of FIG. 2 after correction of erroneous height values using the method and apparatus of this invention.
Figure 23:
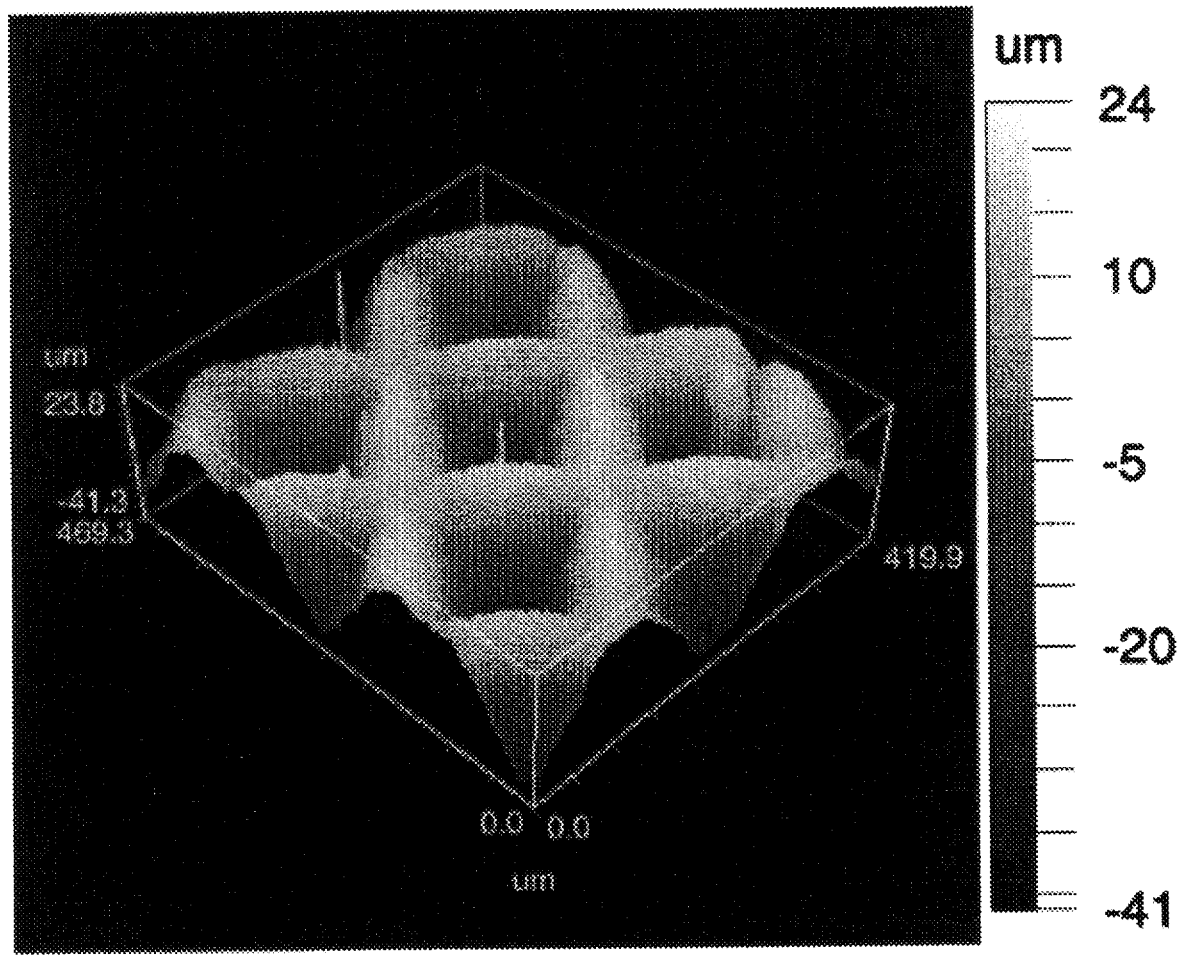
FIG. 23 is an illustration of a video image of the three-dimensional representation of the height map of FIG. 22 after correcting the erroneous height values using the method and apparatus of this invention.

FIG. 22 is an illustration of a video image of the color-coded, two-dimensional height map of FIG. 2 after correction of the erroneous height values using the method and apparatus of this invention. FIG. 23 is an illustration of a video image of FIG. 22 after such restoration process. A comparison between FIGS. 2–3 and 22–23 (representing the surface of a print roll) demonstrates the effectiveness of the signal restoration method of the invention and the realistic height values calculated to correct missing or invalid data points.

It is clear that the system and method so described could be modified by those skilled in the art to include refinements that have been ignored in this disclosure. For example, the definition of pixel adjacency could be modified to include pixels abutting diagonally through corners. Similarly, the distance from the border of erroneous-height pixel regions could be expressed by a measure different from the position indices detailed herein, so long as representative of the actual physical distance between pixels. These modifications would produce equivalent methods that would require corresponding adjustments in the details of the computation utilized to implement them.

It is understood that many equivalent systems are possible within the scope of the present invention and that those skilled in the art could easily design a different system for a different type of input data. Thus, various changes in the details and steps that have been described may be made by those skilled in the art within the principles and scope of the invention herein illustrated and defined in the appended claims. While the present invention has been shown and described herein in what is believed to be the most practical and preferred embodiment, it is recognized that departures can be made therefrom within the scope of the invention, which is therefore not to be limited to the details disclosed herein, but is to be accorded the full scope of the claims so as to embrace any and all equivalent apparatus and methods.

I claim:

1. A method for restoring and visually displaying missing data in a height map of a target surface being scanned by an optical profiler, comprising the following steps:

(a) generating electronic signals in response to optical height measurements by said optical profiler at predetermined pixels in a grid representative of a two-dimensional subdivision of said target surface;

(b) processing said electronic signals to produce a plurality of height values, wherein each height value corresponds to a pixel in said grid, said plurality of height values comprising valid height values corresponding to valid-height pixels in the grid and erroneous height values corresponding to erroneous-height pixels in the grid;

(c) identifying regions of contiguous erroneous-height pixels in the grid, each of said regions being bounded by at least one erroneous-height-pixel boundary;

(d) for each region so identified, replacing each erroneous height value with a provisional height value consisting of a valid height value corresponding to a selected valid-height pixel on said at least one erroneous-height-pixel boundary for the region;

(e) assigning a position index to each of said erroneous-height pixels representing a distance thereof from said selected valid-height pixel corresponding thereto;

(f) replacing the provisional height value so assigned to each erroneous-height pixel with a corrected height value;

wherein said corrected height value for each erroneous-height pixel is calculated by interpolation of height values selected from provisional height values, corrected height values, and valid height values corresponding to pixels adjacent thereto; and wherein said interpolation is performed starting from an erroneous-height pixel having a greatest position index and continuing sequentially through erroneous-height pixels having progressively-smaller position indices;

(g) converting each valid height value and corrected height value to a signal adapted to provide an input to a visual display device; and (h) producing a visually-perceptible height map of said target surface through said visual display device.

2. The method described in claim 1, wherein steps (d)–(f) consist of the following:

(1) identifying an erroneous height value corresponding to an erroneous-height pixel adjacent to a pixel having a valid height value;

(2) assigning a position index to said erroneous-height pixel representing a distance of one pixel from said adjacent pixel having a valid height value;

(3) replacing said erroneous height value with a provisional height value equal to said valid height value adjacent thereto;

(4) repeating steps (1) through (3) until all erroneous-height pixels adjacent to a pixel having a valid height value have been assigned a position index and a provisional height value;

(5) repeating steps (1) through (4) in successive cycles of operation until all erroneous-height pixels have been assigned a position index and a provisional height value, each cycle being conducted such that provisional height values assigned in an immediately preceding cycle are treated as valid height values and such that said position indices assigned in step (2) are increased at each successive cycle;

(6) identifying a pixel having a position index corresponding to a maximum pixel distance from said at least one erroneous-height-pixel boundary;

(7) surveying all pixels adjacent to the pixel identified in step (6) and determining pixels adjacent thereto having a highest height value and a lowest height value;

(8) calculating a corrected height value for the pixel identified in step (6) by interpolation of said highest and lowest height values in relation to position indices corresponding thereto;

(9) assigning said corrected height value to the pixel identified in step (6);

(10) assigning a position index representing a distance of zero pixels to the pixel identified in step (6); and

(11) repeating steps (6) through (10) until all pixels in the region have been assigned a corrected height value.

3. The method described in claim 2, wherein said position indices consist of integers, each unit corresponding to one pixel.

4. The method described in claim 3, wherein said linear interpolation in step (7) is performed by the following equation:

$$h(\text{corr}) = h(\text{min}) + \frac{ind(\text{min}) + 1}{[ind(\text{min}) + ind(\text{max}) + 2]} [h(\text{max}) - h(\text{min})]$$

where h(corr) is a corrected height value for a given pixel; h(min) is said lowest height value; h(max) is said highest height value; ind(min) is a position index corresponding to h(min); and ind(max) is a position index corresponding to h(max).

5. The method described in claim 1, wherein said steps (b) through (f) are performed by creating a matrix of height values and a matrix of position indices, both matrices having size equal to that of said grid representative of a two-dimensional subdivision of said target surface; by sequentially updating the matrix of height values to record provisional height values and corrected height values; and by sequentially updating the matrix of position indices to record current position indices.

6. The method described in claim 2, wherein said steps (b) through (f) are performed by creating a matrix of height values and a matrix of position indices, both matrices having size equal to that of said grid representative of a two-dimensional subdivision of said target surface; by sequentially updating the matrix of height values to record provisional height values and corrected height values; and by sequentially updating the matrix of position indices to record current position indices.

7. Apparatus for restoring and visually displaying missing data in a height map of a target surface being scanned by an optical profiler, comprising the following components:

(a) means for generating electronic signals in response to optical height measurements by said optical profiler at predetermined pixels in a grid representative of a two-dimensional subdivision of said target surface;

(b) means for processing said electronic signals to produce a plurality of height values, wherein each height value corresponds to a pixel in said grid, said plurality of height values comprising valid height values corresponding to valid-height pixels in the grid and erroneous height values corresponding to erroneous-height pixels in the grid;

(c) means for identifying regions of contiguous erroneous-height pixels in the grid, each of said regions being bounded by at least one erroneous-height-pixel boundary;

(d) means for replacing each erroneous height value in each region so identified with a provisional height value consisting of a valid height value corresponding to a selected valid-height pixel on said at least one erroneous-height-pixel boundary for the region;

(e) means for assigning a position index to each of said erroneous-height pixels representing a distance thereof from said selected valid-height pixel corresponding thereto;

(f) means for replacing the provisional height value so assigned to each erroneous-height pixel with a corrected height value; wherein said corrected height value for each erroneous-height pixel is calculated by interpolation of height values selected from provisional height values, corrected height values, or valid height values corresponding to pixels adjacent thereto; and wherein said interpolation is performed starting from an erroneous-height pixel having a greatest position index and continuing sequentially through erroneous-height pixels having progressively-smaller position indices;

(g) means for converting each valid height value and corrected height value to a signal adapted to provide an input to a visual display device; and (h) a visual display device adapted to convert said input into a visually-perceptible height map of said target surface.

* * * * *